US010703362B2

(12) United States Patent
Maura

(10) Patent No.: US 10,703,362 B2
(45) Date of Patent: Jul. 7, 2020

(54) AUTONOMOUS DRIVING AUTONOMOUS SYSTEM, AUTOMATED DRIVING ASSISTANCE METHOD, AND COMPUTER PROGRAM

(71) Applicant: AISIN AW CO., LTD., Anjo-shi, Aichi-ken (JP)

(72) Inventor: Masao Maura, Seto (JP)

(73) Assignee: AISIN AW CO., LTD., Anjo (JP)

( * ) Notice: Subject to any disclaimer, the term of this patent is extended or adjusted under 35 U.S.C. 154(b) by 191 days.

(21) Appl. No.: 15/777,808

(22) PCT Filed: Dec. 21, 2016

(86) PCT No.: PCT/JP2016/088143
§ 371 (c)(1),
(2) Date: May 21, 2018

(87) PCT Pub. No.: WO2017/110892
PCT Pub. Date: Jun. 29, 2017

(65) Prior Publication Data
US 2018/0345963 A1 Dec. 6, 2018

(30) Foreign Application Priority Data
Dec. 22, 2015 (JP) ................................. 2015-249845

(51) Int. Cl.
*B60W 30/12* (2020.01)
*G06F 16/29* (2019.01)
(Continued)

(52) U.S. Cl.
CPC ........... *B60W 30/12* (2013.01); *G05D 1/0088* (2013.01); *G05D 1/0212* (2013.01);
(Continued)

(58) Field of Classification Search
CPC ... B60W 30/12; B60W 2550/10; G06F 16/29; G05D 1/0088; G05D 1/0212;
(Continued)

(56) References Cited

U.S. PATENT DOCUMENTS 5,938,707 A 8/1999 Uehara
8,798,841 B1 * 8/2014 Nickolaou ......... B62D 15/0265
701/23

(Continued)

FOREIGN PATENT DOCUMENTS

JP  H09-062346 A  3/1997
JP  2001-283380 A  10/2001
(Continued)

OTHER PUBLICATIONS

Mar. 14, 2017 International Search Report issued in International Application No. PCT/JP2016/088143.
(Continued)

*Primary Examiner* — Calvin Cheung
(74) *Attorney, Agent, or Firm* — Oliff PLC

(57) ABSTRACT

Autonomous driving assistance systems, methods, and programs acquire a planned travel route along which a host vehicle plans to travel and acquire map information including lane information about a road that is included in the planned travel route. The systems, methods, and programs acquire, from outside the host vehicle, obstacle information that includes a location of an obstacle on the road and that has been acquired by another vehicle that travels along the planned travel route ahead of the host vehicle, and generate, as assistance information that is used to perform autonomous driving assistance in the host vehicle that travels along the planned travel route, a travel trajectory candidate for the host vehicle based on the obstacle information and the lane information about the planned travel route.

15 Claims, 15 Drawing Sheets

(51) Int. Cl.
  G05D 1/02 (2020.01)
  G05D 1/00 (2006.01)
  G06K 9/00 (2006.01)
(52) U.S. Cl.
  CPC ........... G05D 1/0223 (2013.01); G06F 16/29 (2019.01); G06K 9/00798 (2013.01); G06K 9/00805 (2013.01); *B60W 2554/00* (2020.02); *G05D 2201/0213* (2013.01)
(58) Field of Classification Search
  CPC ......... G05D 1/0223; G05D 2201/0213; G06K 9/00798; G06K 9/00805
  See application file for complete search history.

(56) References Cited

U.S. PATENT DOCUMENTS

| | | | | |
|---|---|---|---|---|
| 9,056,395 | B1* | 6/2015 | Ferguson | B60W 30/16 |
| 9,187,117 | B2* | 11/2015 | Spero | B60W 30/18163 |
| 2009/0118994 | A1* | 5/2009 | Mori | G06K 9/00798 |
| | | | | 701/117 |
| 2010/0332127 | A1* | 12/2010 | Imai | B60W 30/12 |
| | | | | 701/532 |
| 2012/0083947 | A1* | 4/2012 | Anderson | G08G 1/165 |
| | | | | 701/3 |
| 2012/0083964 | A1 | 4/2012 | Montemerlo et al. | |
| 2012/0150437 | A1* | 6/2012 | Zeng | G01S 19/48 |
| | | | | 701/456 |
| 2013/0211656 | A1* | 8/2013 | An | G05D 1/0221 |
| | | | | 701/25 |
| 2014/0207325 | A1* | 7/2014 | Mudalige | B62D 15/025 |
| | | | | 701/26 |
| 2014/0278052 | A1* | 9/2014 | Slavin | G08G 1/0145 |
| | | | | 701/400 |
| 2015/0316386 | A1* | 11/2015 | Delp | G01C 21/3658 |
| | | | | 701/532 |
| 2016/0016585 | A1* | 1/2016 | Park | B60W 30/12 |
| | | | | 701/41 |
| 2016/0071418 | A1* | 3/2016 | Oshida | G08G 1/22 |
| | | | | 701/23 |
| 2016/0259338 | A1* | 9/2016 | Nakamura | B60W 30/12 |
| 2016/0347327 | A1 | 12/2016 | Kondo et al. | |
| 2017/0025017 | A1* | 1/2017 | Thomas | H04L 67/12 |
| 2017/0028995 | A1* | 2/2017 | Mori | G01D 7/10 |
| 2017/0039856 | A1* | 2/2017 | Park | B60K 35/00 |
| 2017/0075355 | A1* | 3/2017 | Micks | G05D 1/0257 |
| 2017/0123434 | A1* | 5/2017 | Urano | B60W 30/182 |
| 2017/0227971 | A1* | 8/2017 | Shimotani | B60W 30/12 |
| 2017/0243485 | A1* | 8/2017 | Rubin | G08G 1/052 |

FOREIGN PATENT DOCUMENTS

| | | |
|---|---|---|
| JP | 2008-234044 A | 10/2008 |
| JP | 2012-59274 A | 3/2012 |
| JP | 2012-214124 A | 11/2012 |
| JP | 2013-544695 A | 12/2013 |
| JP | 2015-157604 A | 9/2015 |
| JP | 2015-199439 A | 11/2015 |

OTHER PUBLICATIONS

"Basic of Sensor Information Processing in Vehicles and Adapting to Driving Assistance and Automated Driving." Kanazawa University, Jun. 3, 2013.

* cited by examiner

FIG. 2

OBSTACLE INFORMATION

| OBSTACLE | LOCATION (ON MAP) | OBSTACLE DETAILS | START TIME | END TIME |
|---|---|---|---|---|
| ROADWORK SECTION | (x1, y1)-(x2, y2) | RESTRICTION INFORMATION, LANE OCCUPANCY RATE, ETC. | 2015/12/10 10:00 | 2015/12/10 18:00 |
| PARKED VEHICLE | (x3, y3) | LANE OCCUPANCY RATE, ETC. | 2015/12/10 10:25 | 2015/12/10 10:35 |
| VEHICLE STUCK IN CONGESTION | (x4, y4)-(x5, y5) | TRAFFIC FLOW SPEED, ETC. | 2015/12/10 10:33 | 2015/12/10 11:33 |
| PARKED VEHICLE | (x6, y6) | LANE OCCUPANCY RATE, ETC. | 2015/12/10 10:46 | 2015/12/10 11:16 |
| ... | ... | ... | ... | ... |

AUTONOMOUS DRIVING AUTONOMOUS SYSTEM, AUTOMATED DRIVING ASSISTANCE METHOD, AND COMPUTER PROGRAM

TECHNICAL FIELD

Related technical fields include autonomous driving assistance systems, methods, and programs for performing autonomous driving assistance in a vehicle.

BACKGROUND

In recent years, autonomous driving assistance systems have been newly proposed which provide a vehicle traveling mode other than manual traveling in which a vehicle travels in response to driving operations by a user. The autonomous driving assistance system causes a vehicle to perform some or all of driving operations that are to be performed by a user, thus assisting a user to drive the vehicle. The autonomous driving control system detects, as necessary, the current location of a vehicle, a lane where the vehicle travels, the locations of other vehicles around, etc. and autonomously performs vehicle control of a steering wheel, a driving source, a brake, etc. so that the vehicle travels along a preset route.

What is important here to cause the autonomous driving assistance system to appropriately perform driving assistance is to cause the vehicle to correctly understand the environment surrounding the vehicle. Examples of means for causing the vehicle to understand the surrounding environment include information detected by cameras or sensors mounted on the vehicle, and information acquired through communication with external serves or other vehicles. For example, in the technology proposed in Japanese Patent Application Publication No. 2013-544695 (JP 2013-544695 A), when a vehicle travels through a section (hereinafter referred to as an autonomous driving difficult section), such as a merging section or a road work section, where the vehicle has difficulty in traveling by using autonomous driving, the vehicle distributes information about the traveled autonomous driving difficult section to other nearby vehicles, thus providing a warning about the autonomous driving difficult section to the other vehicles that have received the information. It is further proposed that after the warning is provided, the travel route is changed to a route that avoids the autonomous driving difficult section, or the driving mode is changed in whole or in part from autonomous driving to manual driving.

SUMMARY

The technology disclosed in JP 2013-544695 A makes it possible to identify an autonomous driving difficult section whose location is unidentifiable from the current location of a host vehicle, and to identify an autonomous driving difficult section that is unidentifiable from map information. However, in this technology, after the autonomous driving difficult section is identified, control is basically performed to avoid using autonomous driving in the autonomous driving difficult section. Consequently, the travel route may be changed to a detour route that does not travel through the autonomous driving difficult section, or a driver may be forced to drive manually regardless of the intention of the driver.

To solve such conventional problems, exemplary embodiments of the broad inventive principles described herein provide an autonomous driving assistance system, an autonomous driving assistance method, and a computer program that use obstacle information acquired from an outside source to continue autonomous driving assistance that causes a host vehicle to travel along an appropriate travel trajectory at an appropriate speed even when the host vehicle travels through an autonomous driving difficult section.

Exemplary embodiments provide systems, methods, and programs that acquire a planned travel route along which a host vehicle plans to travel and acquire map information including lane information about a road that is included in the planned travel route. The systems, methods, and programs acquire, from outside the host vehicle, obstacle information that includes a location of an obstacle on the road and that has been acquired by another vehicle that travels along the planned travel route ahead of the host vehicle, and generate, as assistance information that is used to perform autonomous driving assistance in the host vehicle that travels along the planned travel route, a travel trajectory candidate for the host vehicle on the basis of the obstacle information and the lane information about the planned travel route. The term "autonomous driving assistance" refers to a function that performs at least some of driver's vehicle operations on behalf of a driver or assists at least some of driver's vehicle operations.

The autonomous driving assistance system, the autonomous driving assistance method, and the computer program having the above structure, acquire, from an outside source, the obstacle information that relates to the obstacle and that has been acquired by another vehicle that travels ahead, and generate the travel trajectory candidate on the basis of the acquired obstacle information, thereby making it possible, even when the host vehicle travels through a section that has the obstacle, to continue the autonomous driving assistance that causes the host vehicle to travel along the travel trajectory that takes into account the obstacle. Thus, it is possible to prevent the occurrence of situations such as where the travel route is changed to a detour route, or where a driver is forced to drive manually regardless of the intention of the driver.

BRIEF DESCRIPTION OF THE DRAWINGS

FIG. 2 is a diagram illustrating an example of obstacle information stored in a distribution information DB.

DETAILED DESCRIPTION OF EXEMPLARY EMBODIMENTS

Figure 1:
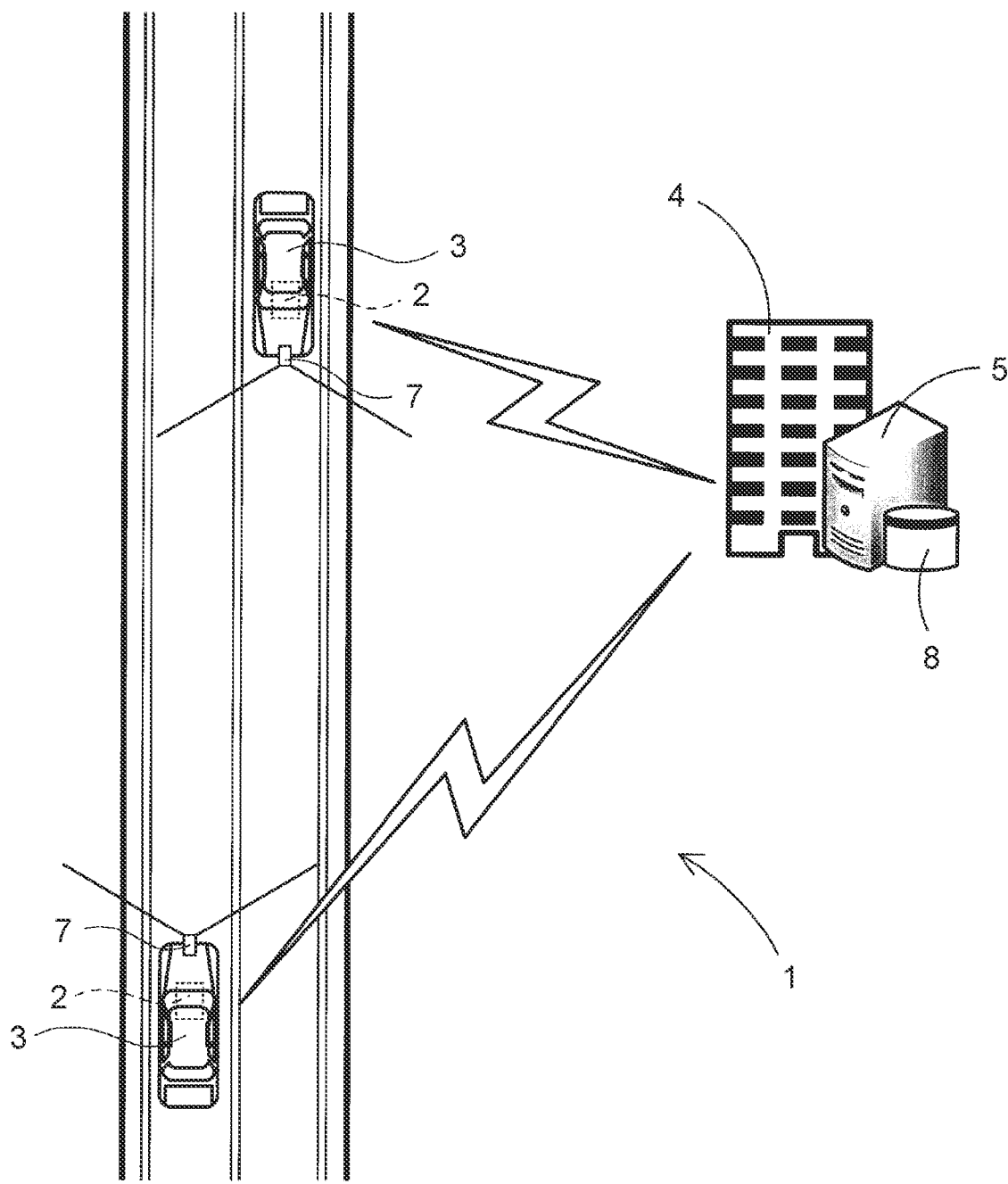
FIG. 1 is a diagram illustrating the schematic structure of an autonomous driving assistance system according to an embodiment.

Below, an autonomous driving assistance system according to an embodiment is described in detail with reference to the drawings. First, the schematic structure of an autonomous driving assistance system 1 according to the embodiment is described with reference to FIG. 1 to FIG. 2. FIG. 1 is a diagram illustrating the schematic structure of the autonomous driving assistance system 1 according to the embodiment.

As illustrated in FIG. 1, according to the embodiment, the autonomous driving assistance system 1 basically includes vehicles 3 and an information distribution server 5. Each of the vehicles 3 has a navigation device 2. The information distribution server 5 is included in an information distribution center 4 that collects detection information about an obstacle detected by a sensor or camera in each of the vehicles 3 and that generates, from the collected detection information about the obstacle, obstacle information that includes the location of the obstacle on a road. The information distribution center 4 distributes the obstacle information. For example, a probe car system may be used as the autonomous driving assistance system 1.

The vehicle 3 travels on roads in a country, and an external vehicle camera 7 (or a sensor of any type, such as a millimeter-wave radar or a laser sensor) mounted on the vehicle 3 detects the obstacle. The obstacle to be detected is an object (a factor) that affects autonomous driving assistance that is performed in the vehicles 3 as described later. Examples of the obstacle include a vehicle parked on a road, a roadwork section, and a vehicle stuck in congestion. The detection information about the detected obstacle is transmitted along with GPS position information to the information distribution server 5 via a vehicle communication module (hereinafter simply referred to as the communication module) pre-mounted on the vehicle 3, such as a mobile phone or a DCM.

On the other hand, the information distribution server 5 collects and accumulates the detection information about the obstacle that is transmitted from each of the vehicles 3 that travel through various areas of the country. From the accumulated detection information about the obstacle, the information distribution server 5 generates obstacle information including the location of the obstacle on a road, and stores the obstacle information in a distribution information DB 6. The information distribution server 5 distributes the obstacle information generated as necessary to each of the vehicles 3.

The obstacle information is information (a so-called dynamic map) that includes valid period information indicating a valid period for information. Specifically, the obstacle information is considered valid only during the period identified by the valid period information. FIG. 2 is a diagram illustrating an example of the obstacle information stored in the distribution information DB 6.

As illustrated in FIG. 2, the obstacle information includes the following: an obstacle type; obstacle location coordinates (in the case of a section, the coordinates of the start and end points of the section) on a road (on a map); the start time of a valid period; and the end time of the valid period. Further, more specific pieces of information are stored as the obstacle information to identify details of an obstacle. For example, in the case of a roadwork section, restriction information (whether or not there is a need to slow down to travel through the section), a lane occupancy rate, a traffic flow speed, etc. are stored. The location of an obstacle on a road may be identified at the vehicle 3 that detects the obstacle. Alternatively, the vehicle 3 may identify only the relative position between the obstacle and the vehicle 3, and the information distribution server 5 may identify the location of the obstacle on the road. The start time of the valid period is, for example, the time when any of the vehicles 3 first detects the corresponding obstacle. On the other hand, the end time of the valid period is the time that is obtained by adding, to the start time, a time period (e.g., 10 minutes in the case of a parked vehicle, one hour in the case of a congested section) that is preset according to the type of the obstacle. For example, since a parked vehicle is estimated to move away about 10 minutes after being parked, it is specified that a parked vehicle identified by the obstacle information no longer exists 10 minutes after the start time, i.e., it is specified that the obstacle information becomes invalid 10 minutes after the start time. The end time of the valid period may be identified by using externally acquired information, such as vehicle information and communication system (VICS: registered trademark) information, if the end time is identifiable or predictable by such external information. For example, in the case of a roadwork section, the period of roadwork is predetermined. Thus, obtaining the external information makes it possible to identify the end time until which the roadwork section remains, i.e., the end time at which the obstacle information becomes invalid. In the case of a vehicle stuck in congestion, the period for which the congestion lasts is predicted from traffic information, such as VICS information. Thus, obtaining the external information makes it possible to identify the end time until which the vehicle stuck in congestion remains, i.e., the end time at which the obstacle information becomes invalid. The valid period information may include only the end time without including the start time. The restriction information, the lane occupancy rate, the traffic flow speed, etc. may be excluded from the obstacle information. The obstacle information may be automatically deleted from the distribution information DB 6 after the end time of the valid period.

According to the embodiment, the autonomous driving assistance system 1 allows the vehicle 3 to travel in the following modes: manual driving traveling in which the vehicle 3 travels in response to driving operations by a user; and assisted traveling in which the vehicle 3 uses autonomous driving assistance to autonomously travel a preset route without driving operations by a user. In vehicle control by the autonomous driving assistance, for example, the current location of the vehicle, a lane where the vehicle travels, and the location of a nearby obstacle are detected as necessary, and the vehicle control ECU 20 autonomously performs vehicle control of a steering wheel, a driving source, a brake, etc. by using the obstacle information distributed from the information distribution server 5 so that the vehicle travels a preset route. According to the embodiment, during the assisted traveling by the autonomous driving assistance, a lane change and a right/left turn are performed through autonomous driving control. Alternatively, part of a lane change and a right/left turn may not be performed through the autonomous driving control may.

The autonomous driving assistance may be performed in all road sections or may be performed only while the vehicle travels in a specific road section (e.g., a highway bordered by a gate (regardless of whether the gate is manned, unmanned, tolled, or untolled)). The description below is based on assumption that autonomous driving section where the autonomous driving assistance of the vehicle is performed covers every road section including local roads and highways, and that the autonomous driving assistance is performed basically during the vehicle travels on a road. It is noted that the autonomous driving assistance is not always performed when the vehicle travels in the autonomous driving section. The autonomous driving assistance is performed only when the following conditions are both satisfied: a user chooses to use the autonomous driving assistance (e.g., by switching an autonomous driving button to an on position); and it is determined that the vehicle is allowed to travel by using the autonomous driving assistance. Details of the autonomous driving assistance are described later.

The navigation device 2 is mounted on the vehicle 3. The navigation device 2 is an in-vehicle device and performs the following functions: displaying a map of the area surrounding a host vehicle on the basis of stored map data; displaying the current location of the vehicle on a map image; and generating assistance information that is used for the autonomous driving assistance, by using the map information and the obstacle information distributed from the information distribution server 5. A control device of the vehicle 3 performs the autonomous driving assistance after the start of travel, on the basis of the assistance information generated by the navigation device 2. Instead of the navigation device 2, the control device of the vehicle 3 may generate the assistance information that is used for the autonomous driving assistance. In such a case, the control device of the vehicle 3 acquires, from the navigation device 2, information necessary to generate the assistance information. The necessary information includes the obstacle information and the map information about the surrounding area. Details of the navigation device 2 are described later.

Figure 3:
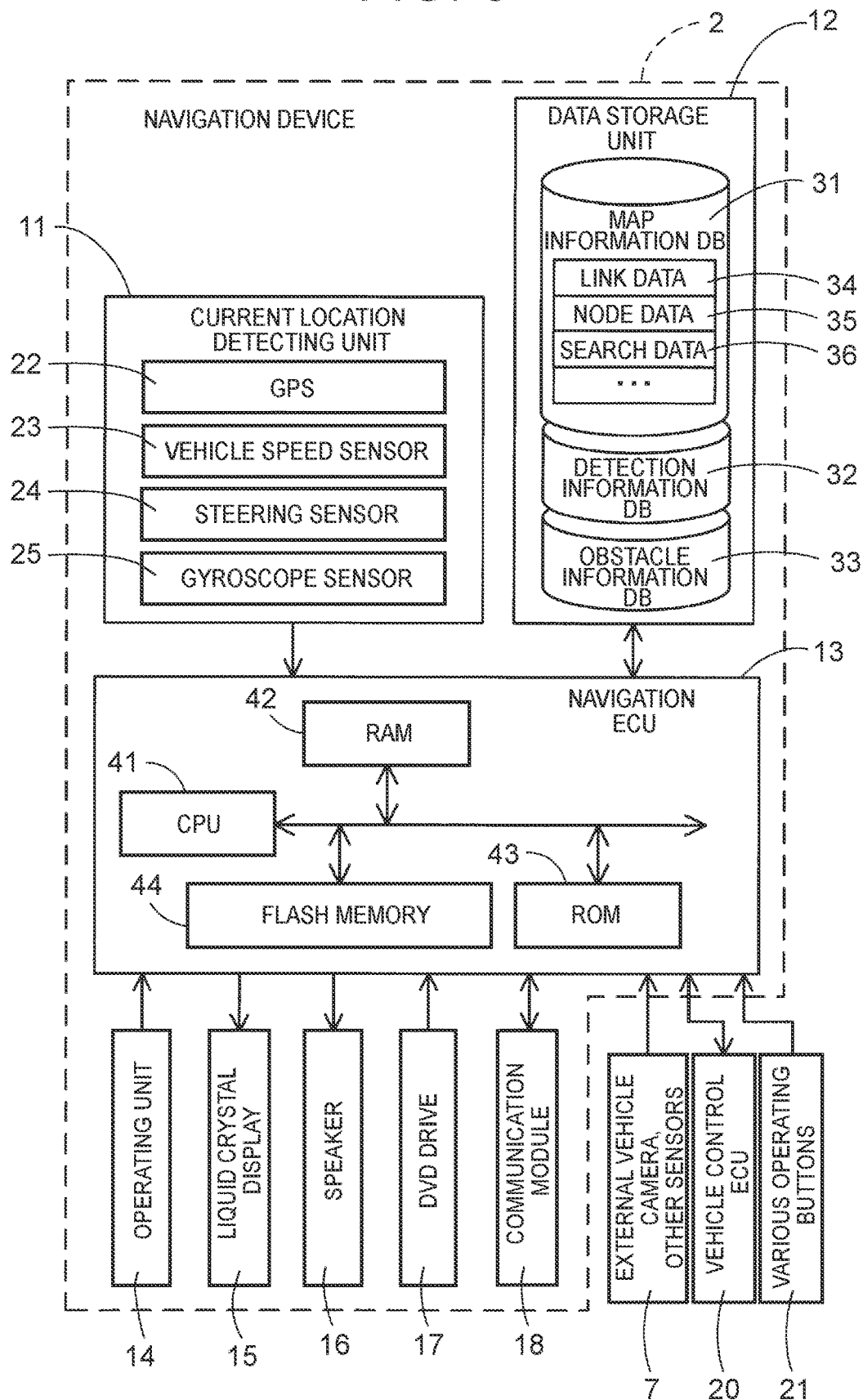
FIG. 3 is a block diagram of a navigation device according to the embodiment.

Next, the schematic structure of the navigation device 2 mounted on the vehicle 3 is described with reference to FIG. 3. FIG. 3 is a block diagram of the navigation device 2 according to the embodiment.

As illustrated in FIG. 3, according to the embodiment, the navigation device 2 includes the following: a current location detecting unit 11 that detects the current location of the vehicle 3 equipped with the navigation device 2; a data storage unit 12 that stores various types of data; a navigation ECU 13 that performs various computations on the basis of input information; an operating unit 14 that receives an operation from a user; a liquid crystal display 15 that displays, to the user, information on a map of the area surrounding the vehicle, a guide route (a route along which the vehicle plans to travel) set in the navigation device 2, etc.; a speaker 16 that outputs voice guidance on route guide; a DVD drive 17 that reads a DVD that is a storage medium; and a communication module 18 that communicates with an information center, such as a probe center or a vehicle information and communication system (registered trade mark: VICS) center. (As used herein the term "storage medium" is not intended to encompass transitory signals.) The navigation device 2 is connected, via an in-vehicle network, such as CAN, to the external vehicle camera 7 and various sensors mounted on the vehicle 3 that is equipped with the navigation device 2. Further, the navigation device 2 is bidirectionally communicatively coupled to a vehicle control ECU 20 that performs various types of control of the vehicle 3 that is equipped with the navigation device 2. In addition, the navigation device 2 is connected to various operating buttons 21 that are mounted on the vehicle 3 and that include an autonomous driving start button.

Next, the components of the navigation device 2 are described in turn. The current location detecting unit 11 includes a GPS 22, a vehicle speed sensor 23, a steering sensor 24, and a gyroscope sensor 25, so as to detect a vehicle current location and bearing, a vehicle traveling speed, the current time, etc. In particular, the vehicle speed sensor 23 is a sensor for detecting a vehicle traveled distance and a vehicle speed. The vehicle speed sensor 23 generates pulses in response to the rotation of vehicle driving wheels and outputs a pulse signal to the navigation ECU 13. The navigation ECU 13 calculates the rotation speed of the driving wheels and the traveled distance by counting the number of generated pulses. There is no need for the navigation device 2 to include all the four types of sensors. The navigation device 2 may include only one or a few types of sensors among them.

The data storage unit 12 includes a hard disk (not illustrated) and a recording head (not illustrated). The hard disk serves as an external storage device and as a recording medium. The recording head is a driver for reading a map information DB 31, a detection information DB 32, an obstacle information DB 33, a predetermined program, etc. that are stored on the hard disk, and for writing predetermined data on the hard disk. Instead of the hard disk, the data storage unit 12 may include a flash memory, a memory card, or an optical disc, such as a CD or a DVD. The map information DB 31 may be stored in an external server, and the navigation device 2 may acquire the map information DB 31 via communication.

The map information DB 31 is storage means for storing, for example, link data 34 related to roads (links), node data 35 related to node points, search data 36 used for route search or change, facility data related to facilities, map display data used to display a map, intersection data related to intersections, and retrieval data used for location retrieval.

Data recorded as the link data 34 includes the following: data on each link that forms a road to which the link belongs, namely data indicating the width, slope, cant, and bank of the road, the road surface condition, shape complementation point data for identifying the shape (e.g., the shape of a curve on a curved road) of a link between nodes, a merging section, road structure, the number of lanes on the road, the location where the number of lanes decreases, the location where the road width decreases, a railroad crossing, etc.; data on a corner, namely data indicating the radius of curvature, an intersection, a T-junction, the entrance and exit of the corner, etc.; data on road attributes, namely data indicating a downhill road, an uphill road, etc.; and data on road type, namely data indicating a local road, such as a national road, a prefectural road, or a narrow street, and a toll road, such as a national highway, an urban highway, an exclusive automobile road, a local toll road, or a toll bridge. In particular, according to the embodiment, information is also stored that identifies not only the number of lanes on a road, but also lane-use control and road connection (specifically, which lane connects to which road at a branching point) in the direction of travel for each lane. The speed limit set for a road is stored as well.

Data recorded as the node data 35 includes data on the following: a branching point (including an intersection and a T-junction) of an actual road; coordinates (locations) of node points set at predetermined intervals on each road in accordance with the radius of curvature, etc.; node attributes indicating whether a node corresponds to an intersection, etc.; a connection link number list that lists link numbers of links connecting to the node; an adjacent node number list that lists node numbers of nodes located adjacent to the node across a link; and the height (altitude) of each node point.

Data recorded as the search data 36 includes various types of data used for route search processing that searches for a route from a departure point (e.g., the vehicle current location) to a set destination. Specifically, cost calculation data used to calculate search costs, such as a cost (hereinafter referred to as an intersection cost) obtained by quantifying the degree of suitability of a route for an intersection and a cost (hereinafter referred to as a link cost) obtained by quantifying the degree of suitability of a route for a link that forms a road, are stored.

The detection information DB 32 is storage means for storing detection information about the obstacle detected by the external vehicle camera 7 or various sensors mounted on the vehicle 3. As already described, the obstacle is an object (a factor) that affects the autonomous driving assistance that is performed in the vehicle 3. Examples of the obstacle include a vehicle parked on a road, a roadwork section, and a vehicle stuck in congestion. The detection information about the obstacle includes, for example, the type of the obstacle, the location of the obstacle (either the coordinates of the location (absolute location) on a road or the position relative to the vehicle 3 is possible), and details of the obstacle (e.g., in the case of a roadwork section, restriction information and a lane occupancy rate). The type and location of the obstacle are detected, for example, by applying image recognition processing to an image captured by the external vehicle camera 7. Examples of the image recognition processing include binarization and pattern matching using feature points and templates. Such image recognition processing is known in the art and therefore is not described in detail here.

The obstacle information DB 33 is storage means for storing the obstacle information that is distributed from the information distribution server 5. As already described, the obstacle information includes the following: an obstacle type, obstacle location coordinates (in the case of a section, the coordinates of the start and end points of the section) on a road; information for identifying details of the obstacle; the start time of a valid period; and the end time of the valid period (refer to FIG. 2). As described later, the navigation ECU 13 performs the autonomous driving assistance by using the obstacle information that is stored in the obstacle information DB 33. Specifically, the following are generated as assistance information used for the autonomous driving assistance: a travel trajectory candidate that is a candidate for a trajectory along which the vehicle 3 travels; a target speed at which the vehicle 3 travels along the travel trajectory candidate; and, when there are multiple travel trajectory candidates, priorities that prioritize which travel trajectory candidate the vehicle 3 travels along.

On the other hand, the navigation electronic control unit (ECU) 13 is an electronic control unit for performing overall control of the navigation device 2. The navigation ECU 13 has a CPU 41 serving as a computation device and a control device, and internal storage devices that include the following: a RAM 42 that is used as a working memory when the CPU 41 performs various computations and that stores data, such as route data about a search route; a ROM 43 that stores a control program, a later-described assistance information generation processing program (refer to FIG. 4), a later-described autonomous driving control program (refer to FIG. 15), etc.; and a flash memory 44 that stores programs that are read out from the ROM 43. The navigation ECU 13 includes various means as a processing algorithm. For example, planned travel route acquiring means acquires the planned travel route along which the host vehicle plans to travel. Map information acquiring means acquires the map information including lane information on a road that is included in the planned travel route. Obstruction information acquiring means acquires, from the information distribution server 5 outside the host vehicle, the obstacle information that includes the location of the obstacle on the road and that has been acquired by another vehicle that travels along the planned travel route ahead of the host vehicle. Assistance information generating means generates, on the basis of the lane information and the obstacle information about the planned travel route, the target speed and the travel trajectory candidate for the host vehicle as the assistance information used for the autonomous driving assistance that the host vehicle performs.

The operating unit 14 is operated, for example, to input a departure location as a travel starting point and a destination location as a travel ending point, and has multiple operating switches (not illustrated), such as various keys and buttons. In response to switch signals that are output when the switches are operated, such as being pressed down, the navigation ECU 13 performs control to execute operations corresponding to the signals. The operating unit 14 may have a touch panel provided on the front surface of the liquid crystal display 15. Further, the operating unit 14 may have a microphone and a voice recognition device.

The liquid crystal display 15 displays the following, for example: a map image that includes roads; traffic information; an operating guide; an operating menu; a key guide; guidance information about a guide route (planned travel route); news; weather forecast; the time of day; an email; and a television program. A HUD or HMD may be used instead of the liquid crystal display 15.

The speaker 16 outputs voice guidance on traveling along a guide route and traffic information guidance, in response to an instruction from the navigation ECU 13.

The DVD drive 17 is a drive for reading data recorded on a recording medium such as a DVD or CD. On the basis of read data, the DVD drive 17 plays back music and video, updates the map information DB 31, etc. The DVD drive 17 may be replaced with a card slot for reading and writing a memory card.

The communication module 18 is a communication device for receiving the obstacle information, traffic information, probe information, weather information, etc. that are transmitted from the information distribution server 5 or a traffic information center, such as a VICS center or a probe center. For example, the communication module 18 corresponds to a mobile phone or DCM. Further, a vehicle-to-vehicle communication device for performing vehicle-to-vehicle communications and a vehicle to roadside communication device for performing vehicle-to-roadside communications are also included.

The external vehicle camera 7 is, for example, a camera with a solid-state image sensing device, such as a CCD, and is installed on the upper part of the front bumper of the vehicle with its optical axis angled downward by a predetermined degree relative to the horizontal. When the vehicle travels in the autonomous driving section, the external vehicle camera 7 captures an image of the area ahead of the vehicle in the direction of travel. The vehicle control ECU 20 processes the captured image to detect a lane marking on the road where the vehicle travels, nearby obstacles, etc., and performs the autonomous driving assistance of the vehicle on the basis of the detected results. When an obstacle is detected, the vehicle control ECU 20 stores the detection information in the detection information DB 32 and then transmits the detection information to the information distribution server 5. Instead of on the front of the vehicle, the external vehicle camera 7 may be installed on the back or side. As means for detecting obstacles, a sensor, such as a millimeter-wave radar or a laser sensor, may be used instead of a camera.

The vehicle control ECU 20 is an electronic control unit for controlling the vehicle equipped with the navigation device 2. The vehicle control ECU 20 is connected to drive systems of the vehicle including a steering wheel, a brake, and an accelerator. According to the embodiment, in particular, after the autonomous driving assistance is started in the vehicle, the vehicle control ECU 20 performs the autonomous driving assistance of the vehicle by controlling the drive systems.

After the start of travel, the navigation ECU 13 transmits, to the vehicle control ECU 20 via CAN, an instruction signal concerning the autonomous driving assistance. In response to the received instruction signal, the vehicle control ECU 20 performs the autonomous driving assistance after the start of travel. The instruction signal contains information instructing which trajectory the vehicle should travel along and what speed the vehicle should travel at.

Figure 4:
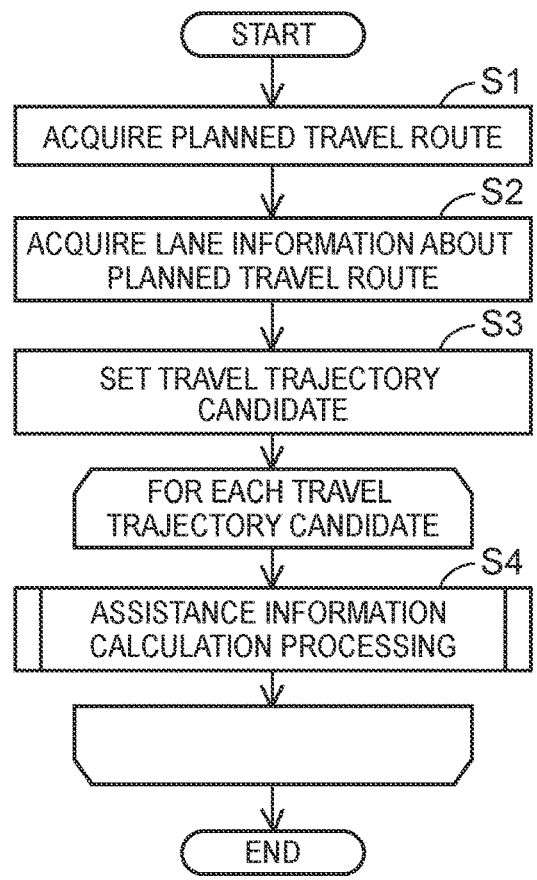
FIG. 4 is a flowchart of an assistance information generation processing program according to the embodiment.
Figure 7:
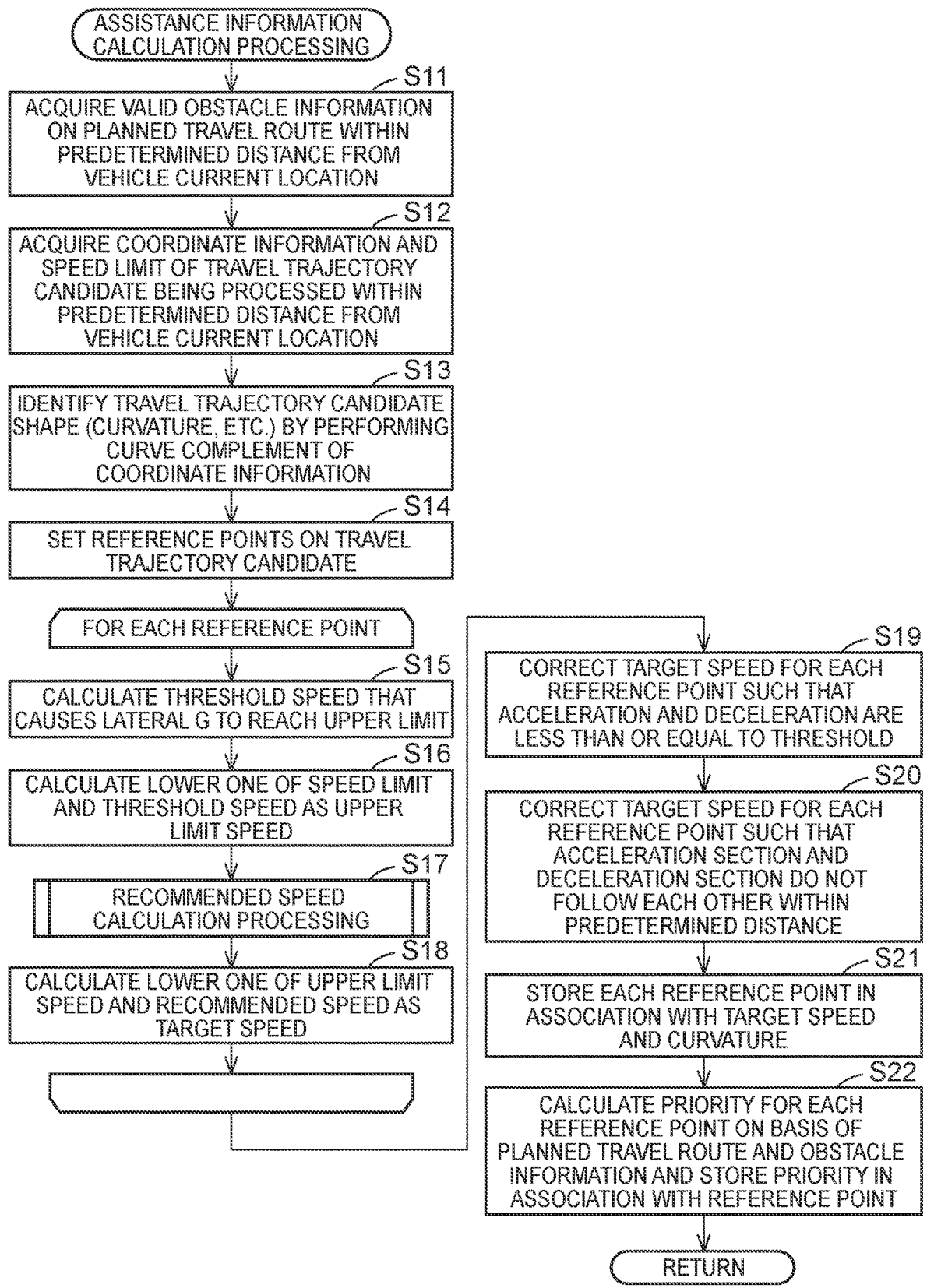
FIG. 7 is a flowchart of a program of subprocessing of assistance information calculation processing.
Figure 14:
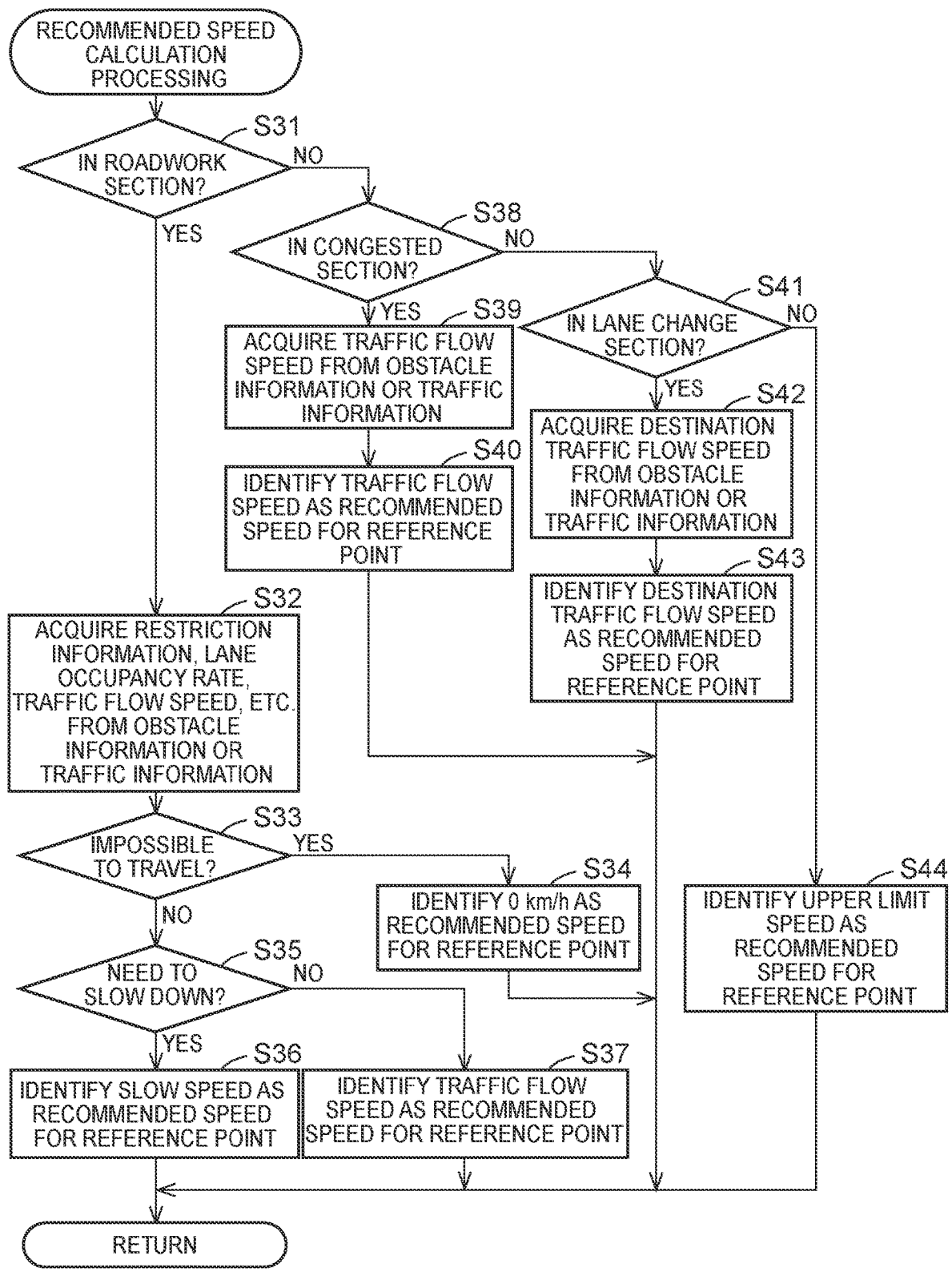
FIG. 14 is a flowchart of a program of subprocessing of recommended speed calculation processing.

Next, an assistance information generation processing program that is executed by the CPU 41 of the navigation device 2 having the above structure according to the embodiment is described with reference to FIG. 4. FIG. 4 is a flowchart of the assistance information generation processing program according to the embodiment. The assistance information generation processing program is executed after an accessory power supply (ACC) of the vehicle is switched ON. The assistance information generation processing program generates the assistance information used for the autonomous driving assistance, on the basis of the obstacle information and the map information that are distributed from the information distribution server 5. The programs illustrated in the flowcharts of FIG. 4, FIG. 7, and FIG. 14 are stored in the RAM 42 or the ROM 43 of the navigation device 2 and are executed by the CPU 41.

In the assistance information generation processing program, the CPU 41 first acquires, in step (hereinafter abbreviated as S) 1, a route (hereinafter referred to as the planned travel route) along which the vehicle plans to travel. If there is a guide route already set in the navigation device 2, a route from the current location of the vehicle to the destination of the guide route currently set in the navigation device 2 is used as the planned travel route. The guide route is a recommended route from a departure location to a destination and is set by the navigation device 2. For example, the guide route is found by using Dijkstra's algorithm that is known in the art. In contrast, if there is no guide route set in the navigation device 2, a route that follows a road from the current location of the vehicle is used as the planned travel route.

Next, in S2, the CPU 41 acquires, from the map information DB 31, lane information about a lane on the planned travel route. Specifically, the CPU 41 acquires information that identifies the number of lanes on a road that is included in the planned travel route, and lane-use control and road connection (which lane connects to which road at a branching point) in the direction of travel for each lane.

Figure 5:
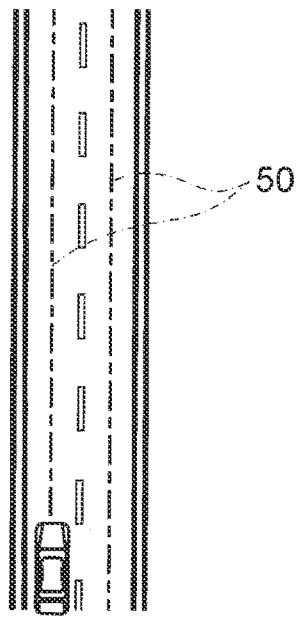
FIG. 5 is a diagram illustrating an example of a travel trajectory candidate that is set for a planned travel route.
Figure 6:
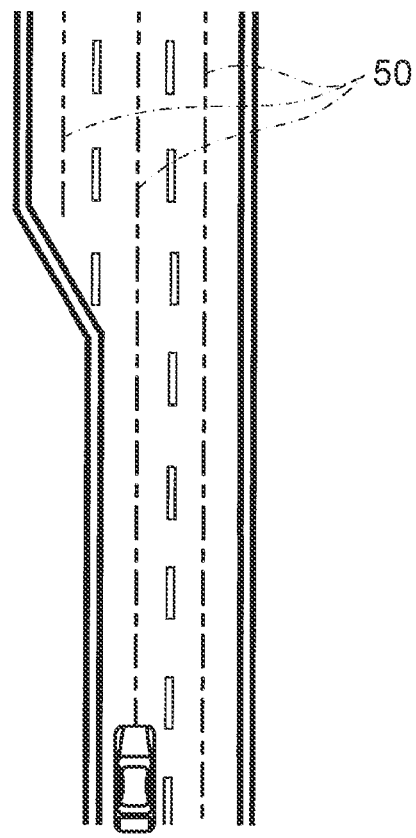
FIG. 6 is a diagram illustrating an example of a travel trajectory candidate that is set for a planned travel route.

Next, in S3, on the basis of the lane information acquired in S2, the CPU 41 sets, for the planned travel route, a candidate (hereinafter referred to as the travel trajectory candidate) for a trajectory along which the vehicle travels. The travel trajectory candidate is set, basically as illustrated in FIG. 5, such that one travel trajectory candidate 50 in the direction of travel of the vehicle is set for each lane (only a lane in the direction of travel, i.e., except an oncoming lane) on the road that forms the planned travel route. For example, in the example of FIG. 5, since the road has two lanes in each direction, a total of two travel trajectory candidates 50 are set for the lanes. As illustrated in FIG. 6, when the number of lanes on the road that forms the planned travel route increases, a new travel trajectory candidate 50 corresponding to the added lane is added at a point where the number of lanes increases. For example, in the case of FIG. 6, since a lane is added as the leftmost lane to the road that has two lanes in each direction, a total of three travel trajectory candidates 50 including the added travel trajectory candidate 50 are set. In contrast, when the number of lanes on the road that forms the planned travel route decreases, the travel trajectory candidate 50 corresponding to the removed lane is removed at a point where the number of lanes decreases. The travel trajectory candidate may be set for the whole of the planned travel route. Alternatively, the travel trajectory candidate may be set only for an area within a predetermined distance (e.g., 300 m) from the current location of the vehicle. The assistance information generation processing program is executed repeatedly each time the vehicle travels a predetermined distance.

All the travel trajectory candidates set in S3 are subject to processing in S4 that is described below. The assistance information generation processing program ends after all the travel trajectory candidates set in S3 are subjected to the processing in S4.

In S4, the CPU 41 first executes a later-described assistance information calculation processing (FIG. 7) for the travel trajectory candidate being processed. The assistance information calculation processing calculates a "target speed", a "trajectory curvature", and a "priority" for each of reference points (information points) that are set at regular intervals on the travel trajectory candidate being processed, and stores them in association with the corresponding reference point. The "target speed" is a value that defines how fast the vehicle should travel when passing through the corresponding reference point, on the assumption that the vehicle travels by autonomous driving along the travel trajectory candidate being processed. The "trajectory curvature" is a value that defines the curvature of a trajectory at the corresponding reference point that is described by the travel trajectory candidate being processed. The "priority" is a value that defines, on a reference-point basis, which travel trajectory candidate the vehicle should preferentially travel along when the travel trajectory candidate being processed is compared to other travel trajectory candidates not being processed. Details of the "target speed", the "trajectory curvature", and the "priority" are described later.

The assistance information used for the autonomous driving assistance performed in the vehicle includes the following: the travel trajectory candidate that is set in S3 for the planned travel route; and the "target speed", the "trajectory curvature", and the "priority" that are stored in S4 in association with each of the reference points on the travel trajectory candidate. The CPU 41 temporarily stores the generated assistance information in a storage medium, such as a memory device, and then performs the autonomous driving assistance of the vehicle by using the assistance information stored in the storage medium (FIG. 14).

Next, subprocessing of the assistance information calculation processing performed in S4 is described with reference to FIG. 7. FIG. 7 is a flowchart of a program of the subprocessing of the assistance information calculation processing.

First, in S11, the CPU 41 acquires, from the obstacle information DB 33, the obstacle information about an obstacle on the planned travel route, in particular, an obstacle present within a predetermined distance from the current location of the vehicle in the direction of travel. As already described, the obstacle information includes the following: the type of the obstacle, the location coordinates of the obstacle (in the case of a section, the coordinates of the start and end points of the section) on the road; information for identifying the details of the obstacle; the start time of the valid period; and the end time of the valid period (refer to FIG. 2). Thus, in S11, the CPU 41 acquires, from the obstacle information DB 33, the obstacle information about the obstacle that is at least partially located within the predetermined distance from the current location of the vehicle in the direction of travel. Further, in S11, the CPU 41 compares the current time with the valid period of the obstacle information and acquires the obstacle information only when the current time is within the valid period (between the start time and the end time). The predetermined distance is, for example, 300 m, and the assistance information generation processing program is executed repeatedly each time the vehicle travels the predetermined distance.

Figure 8:
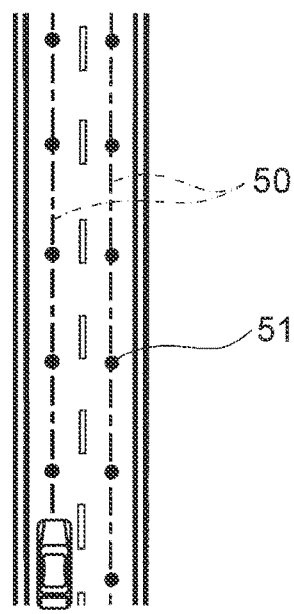
FIG. 8 is a diagram illustrating a coordinate line that identifies a travel trajectory candidate.

Next, in S12, the CPU 41 acquires information about the coordinates and speed limit of the travel trajectory candidate being processed, in particular, the travel trajectory candidate present within the predetermined distance from the current location of the vehicle in the direction of travel. As illustrated in FIG. 8, the travel trajectory candidate 50 is set for each lane on the road that forms the planned travel route, in such a manner as to pass near the center of the lane. Thus, the coordinates of the travel trajectory candidate 50 form a line of coordinates of points 51 that are located near the center of the lane. The coordinates of the travel trajectory candidate is calculated on the basis of such as the following stored in the map information DB 31: the coordinates of both ends (node points) of a link; the location coordinates of a point that completes the shape of the link; the number of lanes; and a lane width. For a road with lanes each having an individual link, the location coordinates of both ends (node points) of the link and the location coordinates of a point that completes the shape of the link may be acquired as the coordinates of the travel trajectory candidate. The information about the coordinates of the travel trajectory candidate (the lane center) may be prestored in the map information DB 31. On the other hand, the speed limit of the travel trajectory candidate is acquired by reading, from the map information DB 31, the speed limit of a corresponding section of the planned travel route.

Next, in S13, the CPU 41 performs curve interpolation of the information about the coordinates of the travel trajectory candidate acquired in S12, thereby identifying the shape and curvature of the travel trajectory candidate.

Subsequently, in S14, the CPU 41 sets the reference points at predetermined intervals on the travel trajectory candidate the shape of which is specifically identified in S13. The reference points are points with respect to which the autonomous driving assistance is performed, and also are information points with which the assistance information that is generated in a manner described later is to be associated. Setting more reference points at smaller intervals generates more pieces of the assistance information, thus making it possible to perform the autonomous driving assistance more accurately. However, this increases a processing load on the CPU 41. The reference points are set at intervals of, for example, 10 m. The coordinates of the set reference points are stored, for example, in the flash memory 44.

All the reference points set in S14 are subject to procedures of S15 to S18 described below. After all the reference points set in S14 are subjected to the procedures of S15 to S18, the flow proceeds to S19.

First, in S15, the CPU 41 calculates, on the basis of the shape and curvature of the travel trajectory candidate that are identified in S13, a speed (hereinafter referred to as a threshold speed) of the vehicle that causes the vehicle to have the maximum lateral acceleration equal to a predetermined upper limit when the vehicle passes through the reference point being processed during travel along the travel trajectory candidate. The upper limit of the lateral acceleration is the upper limit of the lateral acceleration that does not affect the traveling and autonomous driving assistance of the vehicle and that does not make an occupant of the vehicle feel a sense of discomfort. The lateral acceleration is calculated on the assumption that the vehicle travels at the speed limit of the road.

Next, in S16, the CPU 41 compares the speed limit acquired in S12 with the threshold speed calculated in S15 and calculates the lower one of the speed limit and the threshold speed as an upper limit of the speed (hereinafter referred to as the upper limit speed) of the vehicle when the vehicle passes through the reference point being processed.

In S17, the CPU 41 then performs a recommended speed calculation processing that is described later (FIG. 14). The recommended speed calculation processing calculates, on the basis of the obstacle information acquired in S11, a speed (hereinafter referred to as the recommended speed) of the vehicle that is recommended for when the vehicle passes through the reference point being processed during travel along the travel trajectory candidate.

Next, in S18, the CPU 41 compares the upper limit speed calculated in S16 with the recommended speed calculated in S17, and calculates the lower one of the upper limit speed and the recommended speed as a target for the speed (hereinafter referred to as the target speed) of the vehicle when the vehicle passes through the reference point being processed. The calculated target speed is stored, for example, in the flash memory 44, in association with the reference point being processed.

Figure 9:
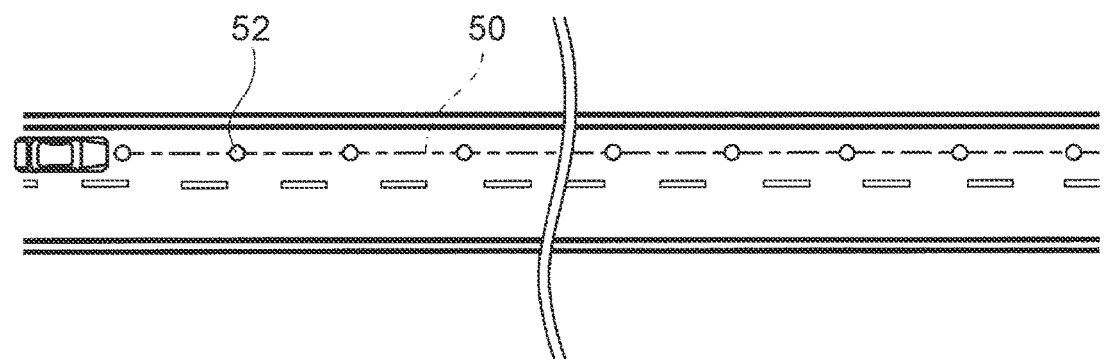
FIG. 9 is a diagram graphically illustrating how target speeds associated with reference points set for a travel trajectory candidate change in the direction of travel of a vehicle.
Figure 9:
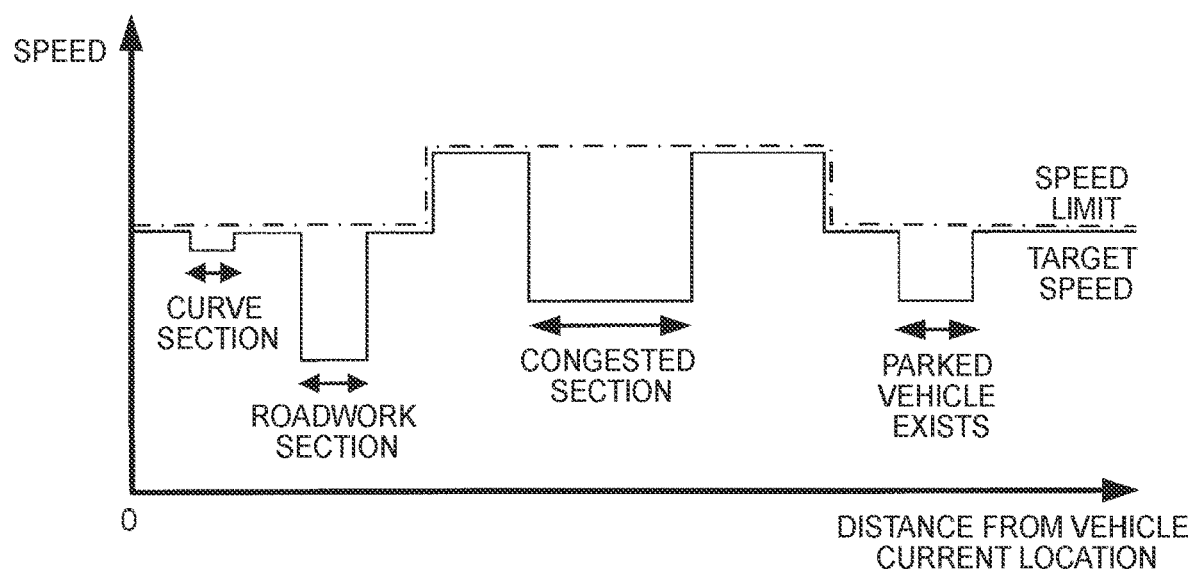

After all the reference points that are set in S14 are subjected to the procedures of S15 to S18 so that all the set reference points are stored in association with the target speeds, the flow proceeds to S19. FIG. 9 is a diagram graphically illustrating how the target speeds associated with the reference points 52 that are set for the travel trajectory candidate 50 change in the direction of travel of the vehicle. As illustrated in FIG. 9, the target speeds at the reference points are basically equal to the speed limit of the road. However, for example, at the reference point in a curve, since the threshold speed at which the lateral acceleration reaches the upper limit is lower than the speed limit, the target speed is set to a speed (determined by the curvature of the curve) that is lower than the speed limit (S16). Further, at the reference point in an area affected by the obstacle, such as a roadwork section or a vehicle stuck in congestion, since the recommended speed is lower than the speed limit, the target speed is set to a speed (determined by the type of the obstacle) that is lower than the speed limit (S18).

Next, in S19, the CPU 41 corrects the target speeds associated with the reference points to satisfy a condition that the acceleration and deceleration of the vehicle are less than or equal to their respective thresholds when the vehicle travels along the travel trajectory candidate. It is noted that this correction is basically allowed only to reduce the target speeds and reduces the target speeds as little as possible as long as the condition is met. Accordingly, the target speeds for the reference points are corrected in a manner illustrated in FIG. 10. The thresholds that define the condition in S19 are set to upper limits of the acceleration and deceleration that do not affect the traveling and autonomous driving assistance of the vehicle and that do not make an occupant of the vehicle feel a sense of discomfort. The threshold of the acceleration may differ from the threshold of the deceleration.

Figure 10:
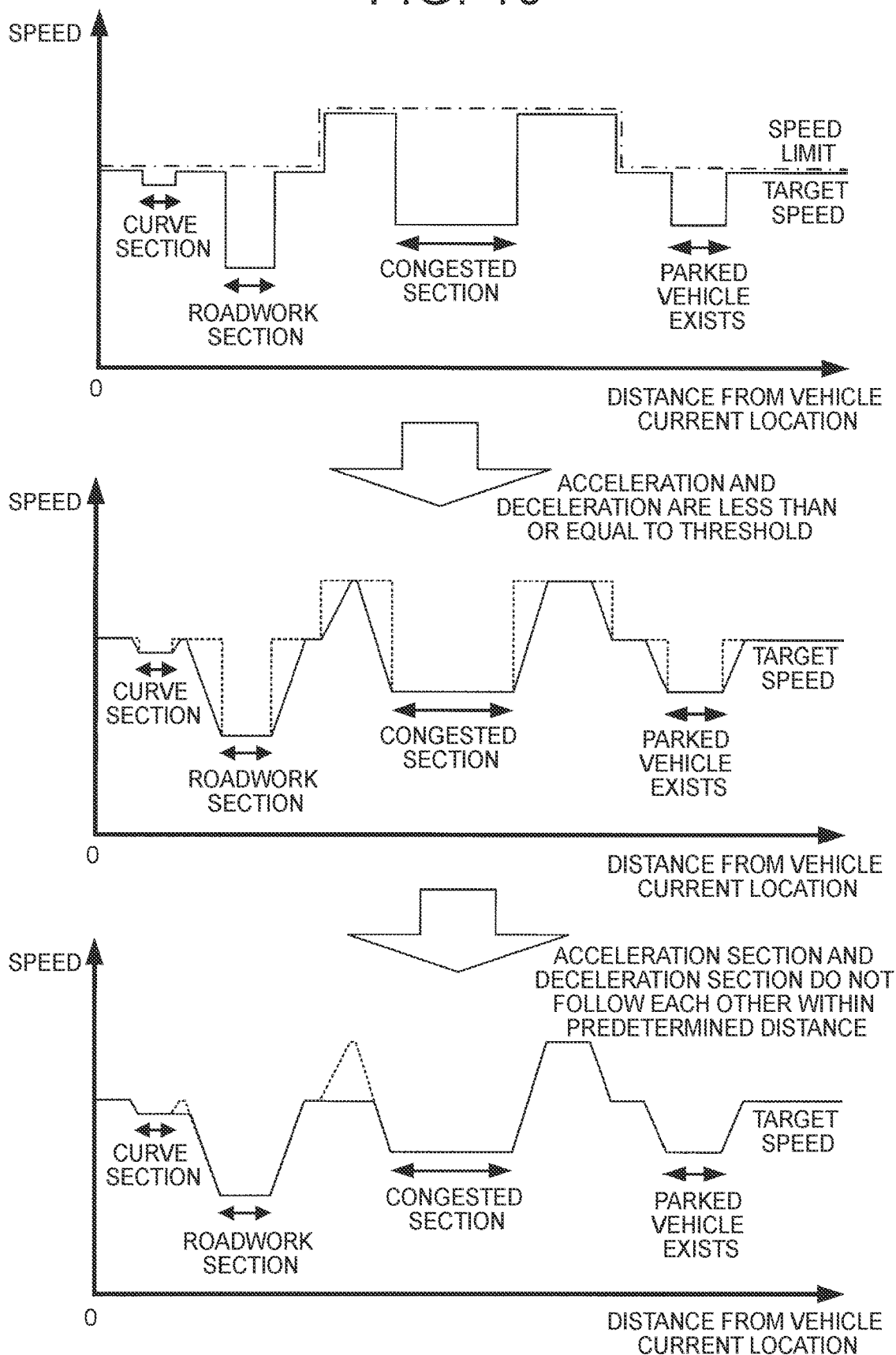
FIG. 10 is a diagram illustrating an example of how to correct target speeds associated with reference points.

Next, in S20, the CPU 41 corrects the target speeds associated with the reference points to satisfy a condition that an acceleration section and a deceleration section do not follow each other within a predetermined distance. It is noted that this correction is basically allowed only to reduce the target speeds and reduces the target speeds as little as possible as long as the condition is met. For example, when there is a deceleration section just after an acceleration section as illustrated in FIG. 10, the target speeds are corrected such that the vehicle travels at a constant speed, without accelerating, until starting decelerating. Accordingly, as illustrated in FIG. 10, the target speeds for the reference points are corrected such that the acceleration section and the deceleration section do not follow each other within the predetermined distance. The predetermined distance that defines the condition in S20 is settable to any distance and may be set, for example, to 100 m.

After that, in S21, the CPU 41 stores the reference points set in S14, for example, in the flash memory 44, in association with the final values of the target speeds that are set in S15 to S18 and that are corrected in S19 and S20.

Next, in S22, the CPU 41 calculates, for each of the reference points set in S14, a value (hereinafter referred to as the priority) that defines, on a reference-point basis, which travel trajectory candidate the vehicle should preferentially travel along when the travel trajectory candidate being processed is compared to other travel trajectory candidates not being processed. The priority is calculated on the basis of the planned travel route and the obstacle information acquired in S11. However, when only one travel trajectory candidate is set (for example, when the vehicle travels on a road with one lane), there is no need to perform the procedure of S22. The method of calculating the priority in S22 is described in detail below.

Specifically, the priority is set as follows on the basis of a standard that differs between in the area affected by the obstacle and in the area unaffected by the obstacle. The area affected by the obstacle refers to the vicinity of a place or section where the obstacle is located, and varies in size according to the type of the obstacle. For example, in the case of an obstacle, such as a roadwork section, that necessitates a lane change, the area affected by the obstacle includes not only a section where the obstacle is located, but also a section that is located before the section to allow the vehicle to make a lane change. Further, in the same section, the area affected by the obstacle includes not only a lane where the obstacle is located, but also a lane where the obstacle is not located. The priority is set to a range, for example, from '0' to '1.0', and indicates that the vehicle should prioritize the reference point with a larger number over the reference point with a smaller number when traveling.

(A) In the area unaffected by the obstacle, the reference point in a lane (e.g., when the vehicle turns right at the next intersection in the direction of travel, a lane that is designated for a right turn in the direction of travel) in which the vehicle should preferentially travel in order to travel along the planned travel route is given higher priority than the reference point in the other lane.

(B) In the area affected by the obstacle, the reference point in a lane where the obstacle is located is given lower priority than the reference point in the other lane.

Figure 11:
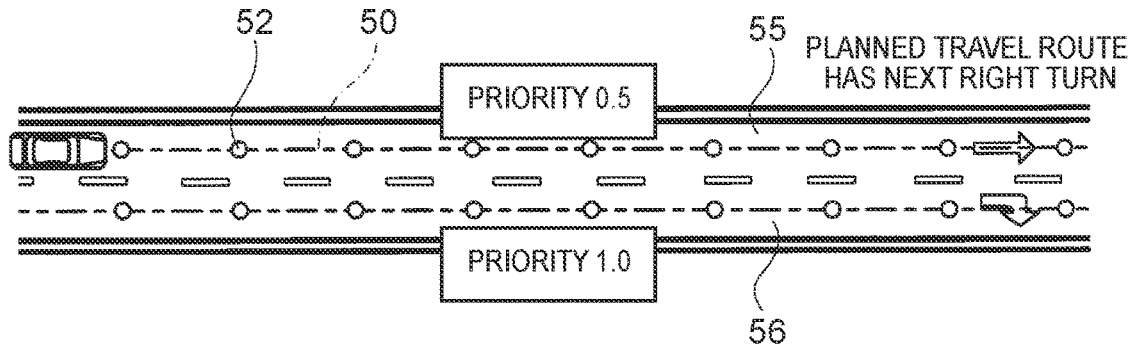
FIG. 11 is a diagram illustrating how to set priorities for reference points in an area unaffected by an obstacle.

In the standard (A), the priority for the reference point in the lane (hereinafter referred to as the preferential lane) in which the vehicle should preferentially travel in order to travel along the planned travel route is set to '1.0', whereas the priority for the reference point in the lane other than the preferential lane is set to '0.5'. Thus, as illustrated in FIG. 11, when there is no obstacle, and the planned travel route has a right turn at the next branching point, the priority for each of the reference points 52 in a lane 55 that is designated for a right turn in the direction of travel is set to '1.0'. On the other hand, the priority for each of the reference points 52 in a lane 56 that is not designated for a right turn in the direction of travel is set to '0.5'. According to the embodiment, the priority for the reference point in the preferential lane is set to '1.0', whereas the priority for the reference point in the lane other than the preferential lane is set to '0.5'. However, the values of the priorities are changeable as long as the reference point in the preferential lane is given higher priority than the reference point in the other lane. For example, the priority for the reference point in the preferential lane may be set to '1.0', whereas the priority for the reference point in the lane other than the preferential lane may be set to '0.7'. The standard (A) may be applied only to an area within a predetermined distance from an intersection at which a right or left turn is necessary.

Figure 12:
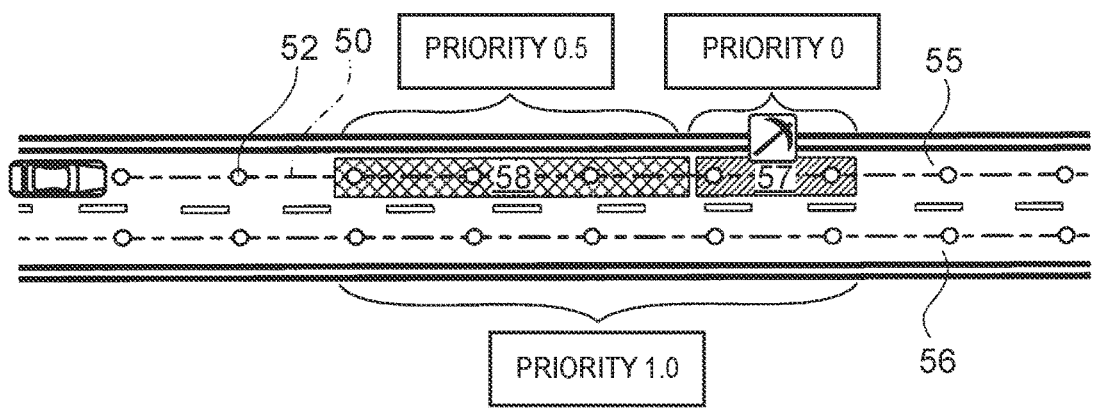
FIG. 12 is a diagram illustrating how to set priorities for reference points in an area affected by an obstacle.

On the other hand, in the standard (B), a degree to which the priority for the reference point in the lane where the obstacle is located is lower than the priority for the reference point in the other lane varies according to the type of the obstacle. Further, as already described, the area affected by the obstacle, i.e., the area that uses the standard (B) to calculate the priority varies according to the type of the obstacle. For example, as illustrated in FIG. 12, when there is a roadwork section 57 as an obstacle that blocks the vehicle from traveling through, the priority for the reference point 52 in the roadwork section 57 in the lane 55 where the obstacle is located is set to '0'. Further, since the vehicle needs to make a lane change when traveling in the lane that has the roadwork section 57, the priority for the reference point in a section that is located upstream of (located closer to the vehicle than) the roadwork section is lowered so that the vehicle preferentially travels in the other lane (so that the vehicle is prompted to make a lane change). Specifically, the priority for the reference point 52 in a lane change section 58 that is set upstream of the roadwork section 57 is set to '0.5'. On the other hand, the priority for the reference point 52 in the lane other than the lane that has the roadwork section 57 and the lane change section 58 is set to '1.0'. The length of the lane change section 58 is set, on the basis of the current speed of the vehicle, to a length that the vehicle needs to prepare for and make a lane change. Thus, as the vehicle is traveling faster, the lane change section is set to a longer length.

Specifically, in the example illustrated in FIG. 12, the area affected by the obstacle covers a road section corresponding to both the roadwork section 57 and the lane change section 58 (including a lane other than the lane that has the roadwork section 57 and the lane change section 58). In contrast, when the obstacle is not an obstacle that makes it impossible for the vehicle to travel in a corresponding lane, the vehicle does not need to make a lane change. Such an obstacle may be a vehicle stuck in congestion. In this case, the area affected by the obstacle covers a road section corresponding only to the congested section. However, in cases where only a specific lane is congested, a lane change section may be set, and the priority in a section that is located upstream of the congested section may be lowered so that the vehicle is prompted to make a lane change.

Figure 13:
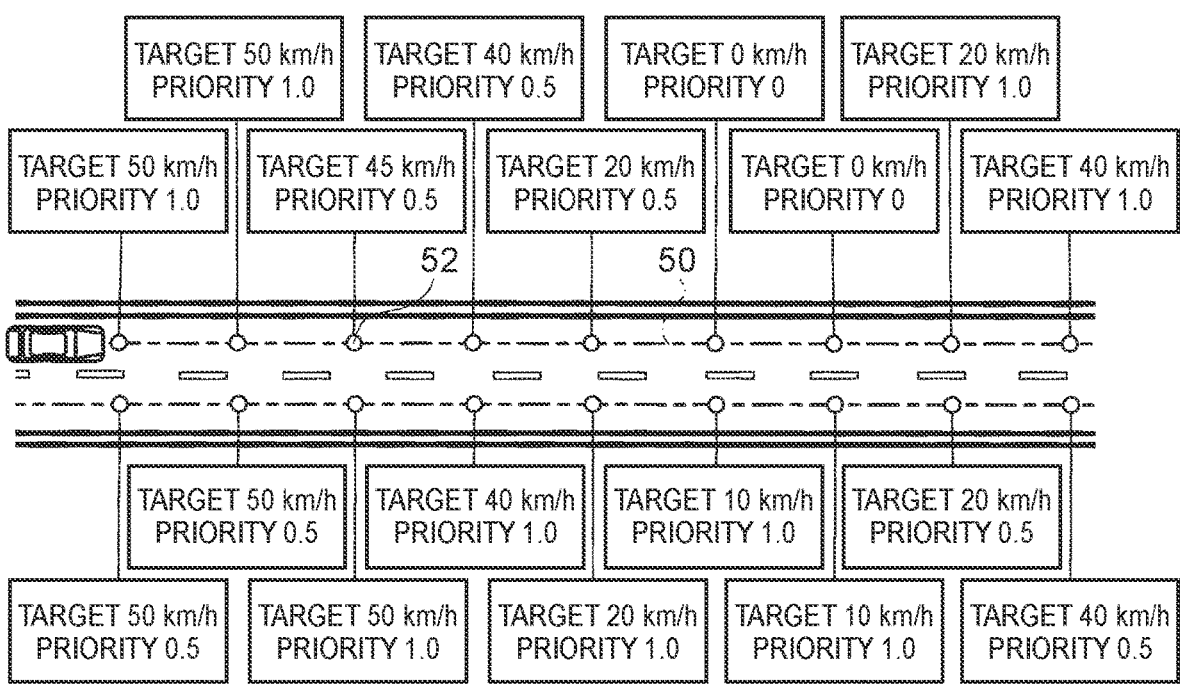
FIG. 13 is a diagram illustrating an example of assistance information associated with reference points of a travel trajectory candidate.

Further, in S22, the CPU 41 stores the calculated values of the priorities, for example, in the flash memory 44, in association with the reference points set in S14. Consequently, as illustrated in FIG. 13, the target speeds and the priorities are stored in association with the reference points 52 that are set for the travel trajectory candidates 50. As described later, the CPU 41 sets a control trajectory that is a trajectory along which the vehicle is caused to travel using the target speeds and the priorities that are set for the reference points 52, and controls the vehicle such that the vehicle travels along the set control trajectory.

Next, subprocessing of the recommended speed calculation processing that is executed in S17 is described with reference to FIG. 14. FIG. 14 is a flowchart of a program of the subprocessing of the recommended speed calculation processing.

First, in S31, the CPU 41 determines, on the basis of the obstacle information acquired in S11, whether the reference point being processed is located especially in a roadwork section. As illustrated in FIG. 2, the obstacle information includes information that identifies the start and end points of the roadwork section.

If it is determined that the reference point being processed is located in the roadwork section (S31: YES), the flow proceeds to S32. In contrast, if it is determined that the reference point being processed is not located in the roadwork section (S31: NO), the flow proceeds to S36.

In S32, the CPU 41 acquires, as information about the roadwork section in which the reference point being processed is determined to be located, restriction information (whether or not there is a need to slow down when the vehicle travels through), a lane occupancy rate, and a traffic flow speed that is the average speed of other vehicles traveling in the roadwork section. If the information is already included in the obstacle information acquired in S11, there is no need to acquire the information again. The information may be newly acquired from an external center, such as a VICS center.

Next, in S33, the CPU 41 determines, on the basis of the information about the roadwork section acquired in S32, whether it is possible for the vehicle to travel in a lane that is under road work. Specifically, when the lane occupancy rate is equal to or greater than a predetermined percentage (e.g., 30% or more), the CPU 41 determines that it is impossible for the vehicle to travel in the lane that is under road work.

If it is determined that it is impossible for the vehicle to travel in the lane that is under road work (S33: YES), the flow proceeds to S34. In contrast, if it is determined that it is possible for the vehicle to travel in the lane that is under road work (S33: NO), the flow proceeds to S35.

In S34, the CPU 41 identifies 0 km/h as the recommended speed because it is impossible for the vehicle to travel through the reference point being processed. After that, the flow proceeds to S18.

On the other hand, in S35, the CPU 41 determines, on the basis of the information about the roadwork section acquired in S32, whether the vehicle needs to slow down when traveling in the lane that is under road work. Specifically, the CPU 41 makes the determination on the basis of the restriction information and the traffic flow speed acquired in S32.

If it is determined that the vehicle needs to slow down when traveling in the lane that is under road work (S35: YES), the flow proceeds to S36. In contrast, if it is determined that the vehicle does not need to slow down when traveling in the lane that is under road work (S35: NO), the flow proceeds to S37.

In S36, the CPU 41 identifies a slow speed (e.g., 10 km/h) as the recommended speed because the vehicle needs to slow down when traveling through the reference point being processed. After that, the flow proceeds to S18.

In contrast, in S37, the CPU 41 identifies, as the recommended speed, the traffic flow speed that is the speed of other vehicles that actually travel in the roadwork section. After that, the flow proceeds to S18.

In S38, the CPU 41 determines, on the basis of the obstacle information acquired in S11, whether the reference point being processed is located especially in a congested section. As illustrated in FIG. 2, the obstacle information includes information that identifies the start and end points of the congested section.

If it is determined that the reference point being processed is located in the congested section (S38: YES), the flow proceeds to S39. In contrast, if it is determined that the reference point being processed is not located in the congested section (S38: NO), the flow proceeds to S41.

In S39, the CPU 41 acquires, as information about the congested section in which the reference point being processed is determined to be located, a traffic flow speed that is the average speed of other vehicles traveling in the congested section. If the information is already included in the obstacle information acquired in S11, there is no need to acquire the information again. The information may be newly acquired from an external center, such as a VICS center.

Next, in S40, the CPU 41 identifies, as the recommended speed, the traffic flow speed that is the speed of other vehicles that actually travel in the congested section. After that, the flow proceeds to S18.

In S41, the CPU 41 determines, on the basis of the obstacle information acquired in S11, whether the reference point being processed is located especially in a lane change section. The lane change section is set upstream of (closer to the vehicle than) an obstacle when the obstacle makes it impossible or difficult for the vehicle to travel in a corresponding lane (i.e., when the obstacle narrows the lane). Such an obstacle may be a parked vehicle or a roadwork section. For example, the lane occupancy rate included in the obstacle information is used to determine whether the obstacle makes it impossible or difficult for the vehicle to travel in the lane. In this case, for example, when the lane occupancy rate of the obstacle is 30% or more, it is determined that the obstacle makes it impossible or difficult for the vehicle to travel in the lane. The length of the lane change section is set, on the basis of the current speed of the vehicle, to a length that the vehicle needs to prepare for and make a lane change. Thus, as the vehicle travels faster, the lane change section is set to a longer length.

If it is determined that the reference point being processed is located in the lane change section (S41: YES), the flow proceeds to S42. In contrast, if it is determined that the reference point being processed is not located in the lane change section (S41: NO), the flow proceeds to S44.

In S42, the CPU 41 acquires, as information about the lane change section in which the reference point being processed is determined to be located, a traffic flow speed that is the average speed of vehicles in the area affected by the obstacle (i.e., in a section adjacent to the lane change section or obstacle) within a destination lane to which the vehicle will move when a lane change is made. If the information is already included in the obstacle information acquired in S11, there is no need to acquire the information again. The information may be newly acquired from an external center, such as a VICS center.

Next, in S43, the CPU 41 identifies, as the recommended speed, the traffic flow speed that is the speed of other vehicles in the area affected by the obstacle within the destination lane to which the vehicle will move when a lane change is made. After that, the flow proceeds to S18.

In contrast, in S44, the CPU 41 identifies the upper limit speed calculated in S16 as the recommended speed, because there is no obstacle that affects the traveling speed of the vehicle. After that, the flow proceeds to S18.

Figure 15:
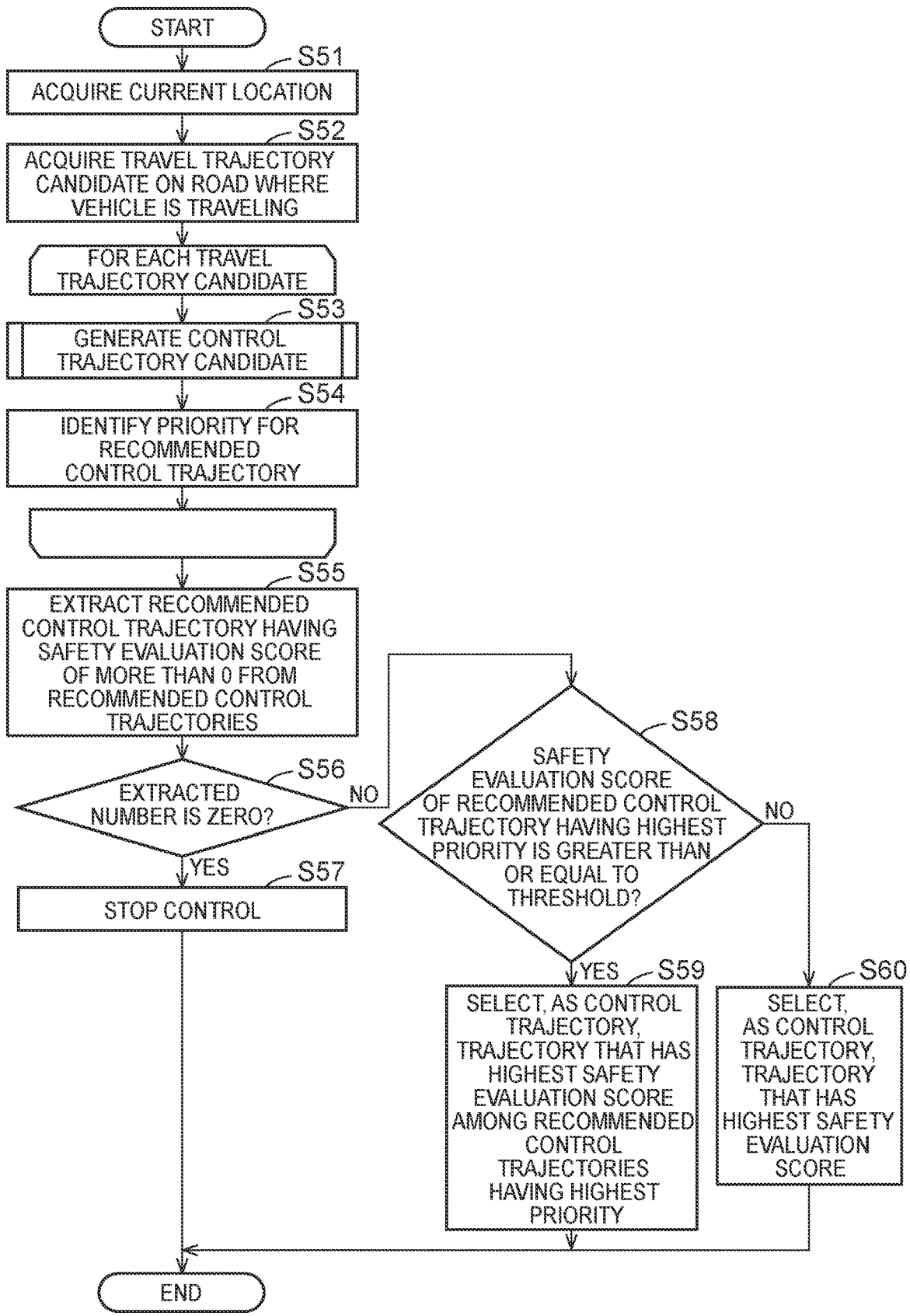
FIG. 15 is a flowchart of an autonomous driving control program according to the embodiment.
Figure 18:
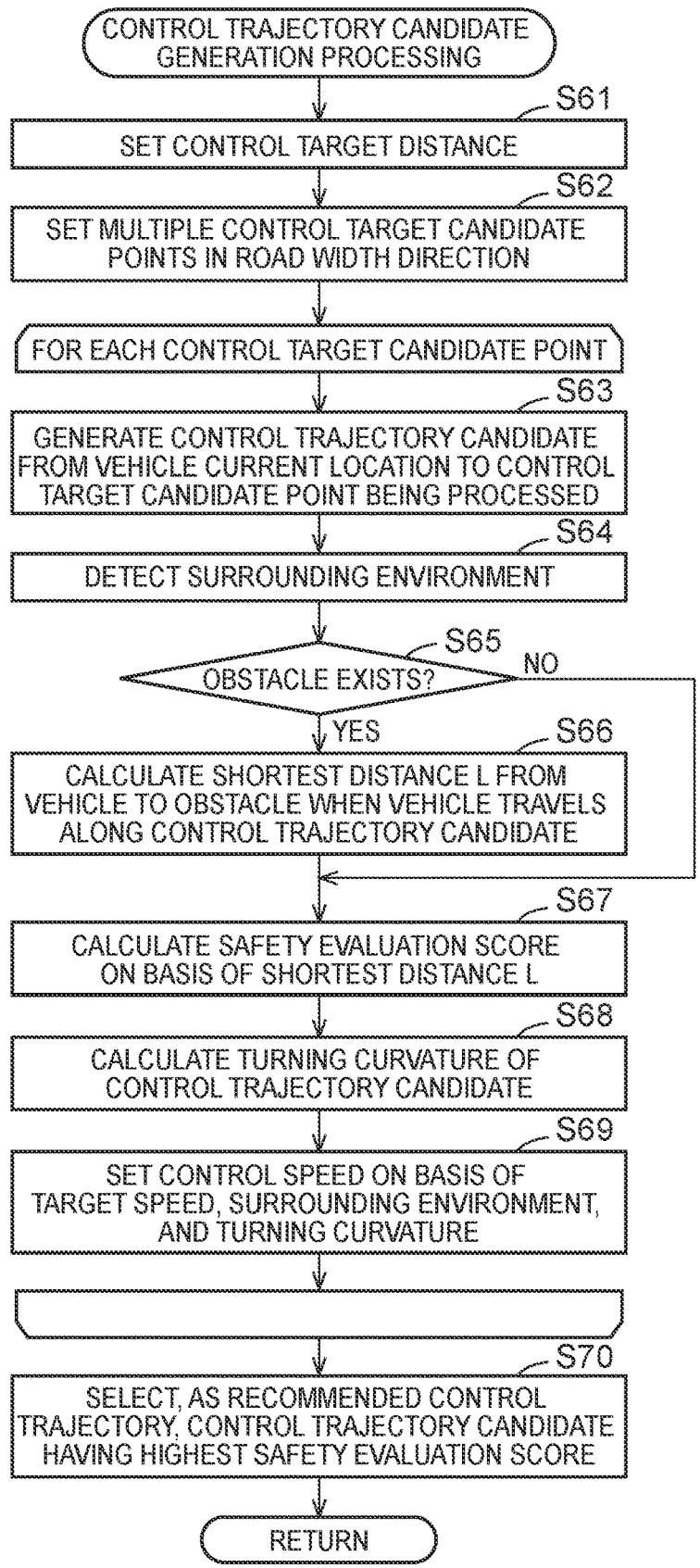
FIG. 18 is a flowchart of a program of subprocessing of control trajectory candidate generation processing.

Next, an autonomous driving control program that is executed by the CPU 41 of the navigation device 2 having the above structure according to the embodiment is described with reference to FIG. 15. FIG. 4 is a flowchart of the autonomous driving control program according to the embodiment. The autonomous driving control program is executed after the accessory power supply (ACC) of the vehicle is switched ON and implements specific autonomous driving assistance by using the assistance information that is generated by the assistance information generation processing program (FIG. 4). The programs illustrated in the flowcharts of FIG. 15, FIG. 18 are stored in the RAM 42 or the ROM 43 of the navigation device 2 and are executed by the CPU 41.

The autonomous driving control program starts with S51 where the CPU 41 acquires the current location of the vehicle that is detected by the current location detecting unit 11. It is preferable that the current location of the vehicle be precisely identified by using high-precision location technology. The high-precision location technology uses image recognition to detect white lines and road paint information that are captured by a camera mounted on a vehicle, and compares the white lines and road paint information with a prestored map information DB, thereby detecting a travel lane and the precise location of the vehicle. The details of such high-precision location technology are known in the art, and are therefore not described here.

Figure 16:
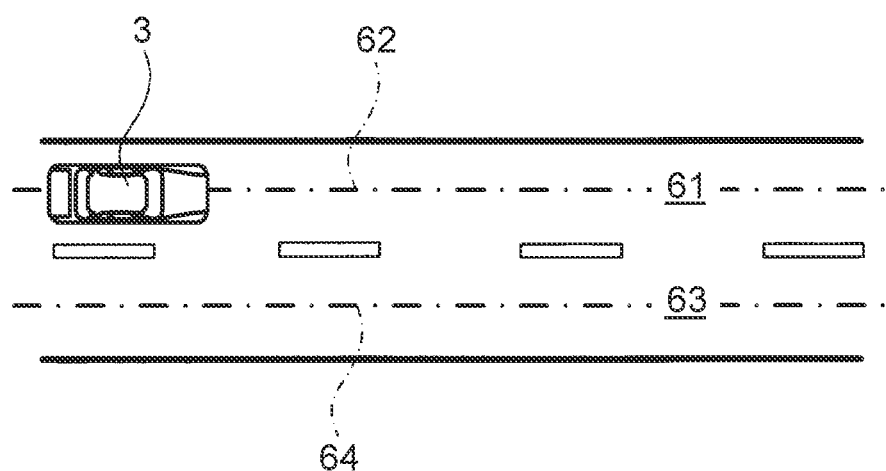
FIG. 16 is a diagram illustrating an example of a travel trajectory candidate that is set ahead in the direction of travel of a vehicle.

Next, in S52, the CPU 41 acquires the travel trajectory candidate that is set in S3 for a section where the vehicle is traveling. As already described, the travel trajectory candidate is basically set such that one travel trajectory candidate in the direction of travel of the vehicle is set for each lane (only a lane in the direction of travel, i.e., except an oncoming lane) on a road. Thus, as illustrated in FIG. 16, when the vehicle 3 travels on a road that has two lanes in each direction, a travel trajectory candidate 62 set for a lane 61 and a travel trajectory candidate 64 set for a lane 63 are both acquired.

All the travel trajectory candidates acquired in S52 are subject to the procedures of S53 and S54 that are described below. After all the travel trajectory candidates acquired in S52 are subjected to the procedures of S53 and S54, the flow proceeds to S55.

First, in S53, the CPU 41 performs a later-described control trajectory candidate generation processing (FIG. 18) for the travel trajectory candidate being processed. The control trajectory candidate generation processing includes the following: generating multiple control trajectory candidates as candidates for control trajectory that moves from the current location of the vehicle to the lane for which the travel trajectory candidate being processed is set; and selecting, as a recommended control trajectory, a control trajectory candidate that has the highest safety evaluation score among the multiple control trajectory candidates. According to the embodiment, one recommended control trajectory is basically selected for each travel trajectory candidate. Thus, for example, when there are three travel trajectory candidates in the section where the vehicle is traveling, three recommended control trajectories are selected.

Figure 17:
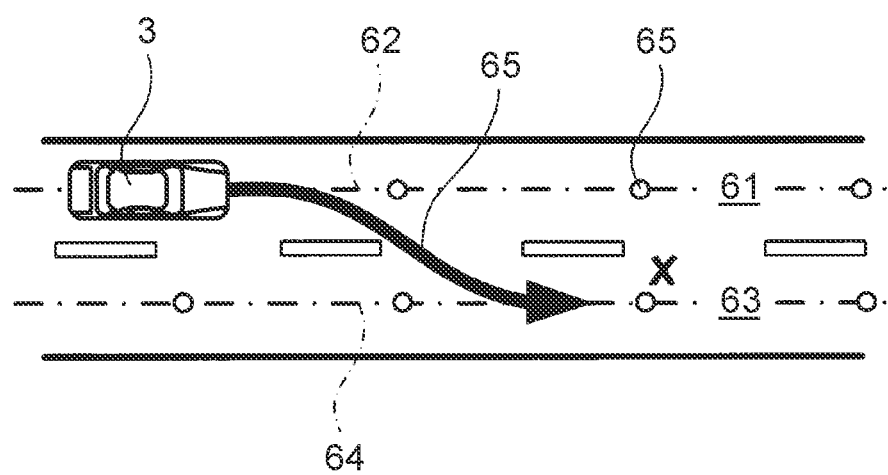
FIG. 17 is a diagram illustrating how to set a priority for a recommended control trajectory.

Next, in S54, the CPU 41 identifies a priority for the recommended control trajectory selected in S53. Specifically, out of the priorities (FIG. 13) that are stored in association with the reference points by the assistance information generation processing program (FIG. 4), the priority stored in association with the reference point that is on the travel trajectory candidate being processed and that is located closest to the end point of the recommended control trajectory is identified as the priority for the recommended control trajectory. For example, as illustrated in FIG. 17, when a recommended control trajectory 65 that moves from the current location of the vehicle to the lane 63 for which the travel trajectory candidate 64 is set is selected, the priority associated with a reference point X that is on the travel trajectory candidate 64 and that is located closest to the end point of the recommended control trajectory 65 is identified as the priority for the recommended control trajectory 65. The priority identified in S54 is stored, for example, in the flash memory 44, in association with information that identifies the recommended control trajectory selected in S53.

Then, in S55, the CPU 41 refers to a safety evaluation score of each of the recommended control trajectories that are selected in S53 for the respective travel trajectory candidates, and extracts the recommended control trajectory having the safety evaluation score of more than "0". The safety evaluation score is a value representing a degree of safety when the vehicle travels along the recommended control trajectory. The safety evaluation score of more than "0" indicates that the vehicle is allowed to travel along the corresponding trajectory. The safety evaluation score is calculated by the control trajectory candidate generation processing (FIG. 18) in S53.

After that, in S56, the CPU 41 determines whether the number of the recommended control trajectories extracted in S55 is zero.

If it is determined that the number of the recommended control trajectories extracted in S55 is zero (S56: YES), the flow proceeds to S57. In contrast, if it is determined that the number of the recommended control trajectories extracted in S55 is not zero (S56: NO), the flow proceeds to S58.

In S57, the CPU 41 determines that there is no appropriate control trajectory along which the vehicle travels, and transmits, to the vehicle control ECU 20 via CAN, a signal that instructs the vehicle to stop traveling. As a result, control is performed to stop the vehicle. Instead of the stop control, control may be performed to switch to manual driving traveling by interrupting the autonomous driving assistance.

In contrast, in S58, the CPU 41 refers to the priority for each of the recommended control trajectories identified in S54 and extracts the recommended control trajectory having the highest priority. Further, the CPU 41 determines whether the safety evaluation score of the recommended control trajectory having the highest priority is greater than or equal to a threshold. The threshold that is used for the determination made in S58 is set to a lower limit of the safety evaluation score that makes it possible to estimate that the vehicle is allowed to travel and travels appropriately along the recommended control trajectory.

If it is determined that the safety evaluation score of the recommended control trajectory having the highest priority is greater than or equal to the threshold (S58: YES), the flow proceeds to S59. In contrast, if it is determined that the safety evaluation score of the recommended control trajectory having the highest priority is less than the threshold (S58: NO), the flow proceeds to S60.

In S59, the CPU 41 selects, as the control trajectory, the recommended control trajectory that has the highest priority among all the recommended control trajectories that are selected in S53 for the respective travel trajectory candidates. If two or more recommended control trajectories have the highest priority, the CPU 41 refers also to their safety evaluation scores and selects, as a final control trajectory, the recommended control trajectory that has the highest safety evaluation score among the recommended control trajectories having the highest priority. After that, the CPU 41 transmits, to the vehicle control ECU 20 via CAN, the finally selected control trajectory and a control speed that defines the vehicle speed when the vehicle travels along the control trajectory. As a result, control is performed to assist the vehicle in traveling along the selected control trajectory at the control speed. The control speed is calculated in the control trajectory candidate generation processing (FIG. 18) in S53.

In contrast, in S60, the CPU 41 selects, as the final control trajectory, the recommended control trajectory that has the highest safety evaluation score among all the recommended control trajectories that are selected in S53 for the travel trajectory candidates. After that, the CPU 41 transmits, to the vehicle control ECU 20 via CAN, the finally selected control trajectory and a control speed that defines the vehicle speed when the vehicle travels along the control trajectory. Accordingly, control is performed to assist the vehicle in traveling along the selected control trajectory at the control speed.

Thus, according to the embodiment, when there is a nearby obstacle or the like (i.e., the safety evaluation score is low) or when a current lane in which the vehicle is traveling has a higher degree than a destination lane to which the vehicle will move, the control trajectory that keeps in the current lane is selected. In contrast, when there is no nearby obstacle or the like (i.e., the safety evaluation score is high) and when there is another lane that has the priority higher than that of the current lane in which the vehicle is traveling, the control trajectory that moves to the lane having the higher priority is selected.

Next, subprocessing of the control trajectory candidate generation processing executed in S53 is described with reference to FIG. 18. FIG. 18 is a flowchart of a program of the subprocessing of the control trajectory candidate generation processing.

First, in S61, the CPU 41 sets a control target distance that is a distance to a later-described control target candidate point. The control target distance is set on the basis of the current speed of the vehicle in such a manner that as the vehicle is traveling faster, the control target distance is set to a longer distance. For example, the control target distance is set to a distance that allows the vehicle to stop at a deceleration of 0.2 G.

Figure 19:
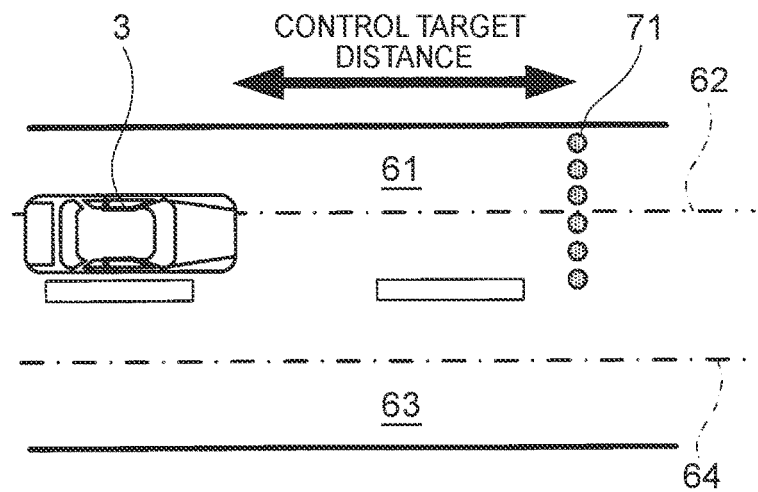
FIG. 19 is a diagram illustrating a control target candidate point that is set ahead in the direction of travel of a vehicle.
Figure 20:
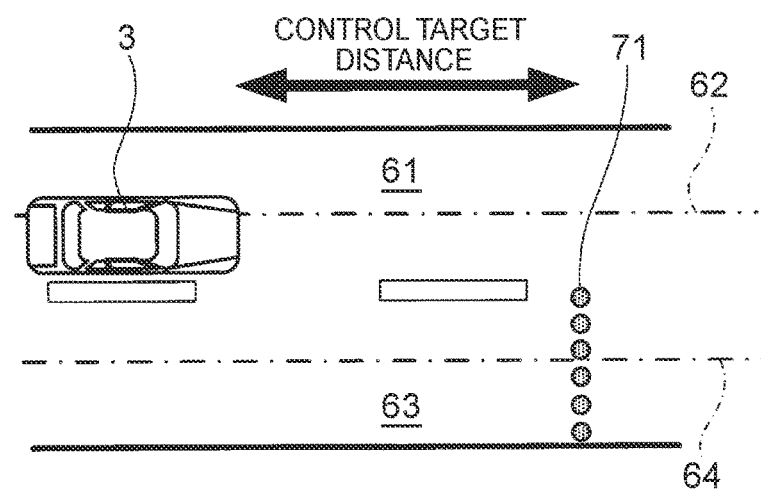
FIG. 20 is a diagram illustrating a control target candidate point that is set ahead in the direction of travel of a vehicle.

Next, in S62, the CPU 41 sets multiple control target candidate points in a lane for which the travel trajectory candidate being processed is set, in such a manner that the control target candidate points are located away from the current location of the vehicle by the control target distance ahead in the direction of travel and are arranged at predetermined intervals (e.g., at intervals of 25 cm) in the road width direction. For example, as illustrated in FIG. 19, when the travel trajectory candidate being processed is the travel trajectory candidate 62 that is set for the lane 61 in which the vehicle is currently traveling, control target candidate points 71 are set on the lane 61. On the other hand, as illustrated in FIG. 20, when the travel trajectory candidate being processed is the travel trajectory candidate 64 that is set for the lane 63 adjacent to the lane 61 in which the vehicle is currently traveling, the control target candidate points 71 are set on the lane 63.

All the control target candidate points that are set in S62 are subject to the procedures of S63 to S69 described below. After all the control target candidate points acquired in S62 are subjected to the procedures of S63 to S69, the flow proceeds to S70.

Figure 21:
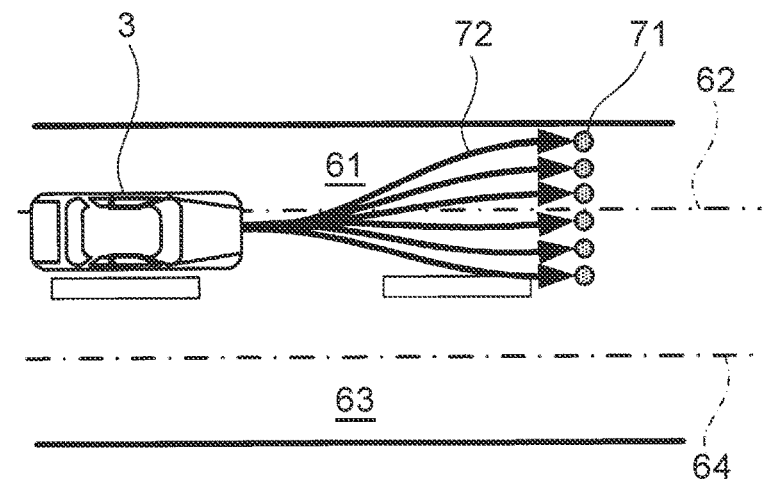
FIG. 21 is a diagram illustrating a control trajectory candidate that is set ahead in the direction of travel of a vehicle.

First, in S63, the CPU 41 generates a trajectory (hereinafter referred to as the control trajectory candidate) from the current location of the vehicle to the control target candidate point being processed. Specifically, a trajectory is generated as the control trajectory candidate such that the trajectory allows the vehicle to travel from the current location of the vehicle to the control target candidate point within a predetermined steering angle while traveling at the target speed that is set for the reference point on the travel trajectory candidate along which the vehicle travels. As a result, as illustrated in FIG. 21, a control trajectory candidate 72 is set for each of the control target candidate points 71 that are set in S62. Although one control trajectory candidate 72 is basically set for each of the control target candidate points 71, multiple control trajectory candidates 72 may be set for each of the control target candidate points 71.

Next, in S64, the CPU 41 detects the environment surrounding the vehicle by using the external vehicle camera 7 or other various sensors. Specifically, the CPU 41 detects whether an obstacle (e.g., a traveling vehicle, a parked vehicle, a guard rail, a roadside tree, etc.) is located in an area surrounding the vehicle and, when there is such an obstacle, identifies the location of the obstacle on the basis of the detection result.

Subsequently, in S65, the CPU 41 determines, on the basis of the detection result of the surrounding environment in S64, whether an obstacle is located in the area surrounding the vehicle (in particular, in the area between the current location of the vehicle and the control target candidate point).

If it is determined that an obstacle is located in the area surrounding the vehicle (S65: YES), the flow proceeds to S66. In contrast, if it is determined that there is no obstacle in the area surrounding the vehicle (S65: NO), the flow proceeds to S67.

In S66, the CPU 41 calculates a shortest distance L from the vehicle to the obstacle on the basis of the control trajectory candidate, generated in S63, from the current location of the vehicle to the control target candidate point being processed, the location of the obstacle detected in S64, and the shape of the vehicle, by assuming that the vehicle travels along the control trajectory candidate.

Next, in S67, the CPU 41 calculates the safety evaluation score of the control trajectory candidate by using the shortest distance L, calculated in S63, from the vehicle to the obstacle. The safety evaluation score is set to range, for example, from '0' to '100', and a higher safety evaluation score represents a safer trajectory. Specifically, when there is no obstacle in the area surrounding the vehicle, the safety evaluation score is calculated to be '100', and as the shortest distance L to the obstacle is shorter, a larger value is subtracted from '100' to calculate the safety score. When the shortest distance L is zero, the safety evaluation score is calculated to be '0'.

Next, in S68, the CPU 41 calculates a turning curvature of the control trajectory candidate on the basis of the shape of the control trajectory candidate, generated in S63, from the current location of the vehicle to the control target candidate point being processed.

Further, in S69, the CPU 41 sets a control vehicle speed that is the speed of the vehicle when the vehicle is caused to travel along the control trajectory candidate, on the basis of the following: the turning curvature calculated in S68; the target speed that is set for the reference point on the travel trajectory candidate where the vehicle travels; and the detection result of the surrounding environment in S64. For example, the control vehicle speed is set to a vehicle speed that allows the vehicle to travel along the control trajectory candidate at an acceleration less than or equal to a threshold and that is as close as possible to the target speed without exceeding the target speed. Further, the control vehicle speed is set by taking into account that the vehicle speed is reduced to a certain speed or less at a location close to the obstacle.

After that, in S70, the CPU 41 extracts the control trajectory candidate that has the highest safety evaluation score calculated in S67 among all the control trajectory candidates generated in S63. The extracted control trajectory candidate is selected as the recommended control trajectory. The flow proceeds to S54.

Figure 22:
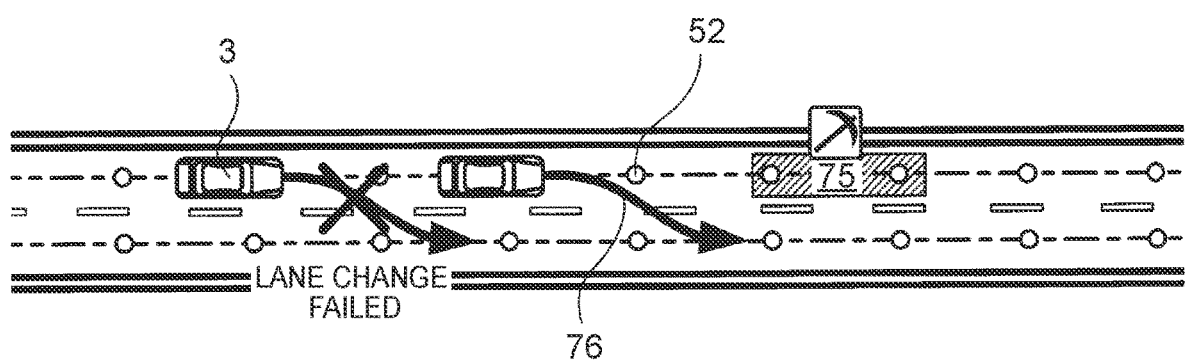
FIG. 22 is a diagram illustrating an example of autonomous driving assistance of a vehicle.

As a result of the above control, for example, as illustrated in FIG. 22, when there is a roadwork section 57 that is located ahead in the direction of travel of the vehicle to block the vehicle from traveling through, it is possible to comprehensively determine which lane the vehicle should travel in (which timing the vehicle should make a lane change at) by referring to the "target speed", the "trajectory curvature", and the "priority" that are set for each of the reference points 52. Further, even when the vehicle fails, for some reasons, to make a lane change at ideal timing for the lane change, a new control trajectory 76 is provided thereafter that moves to an adjacent lane by avoiding the roadwork section 57. This makes it possible to perform appropriate autonomous driving assistance without interrupting the autonomous driving assistance. Further, the vehicle travels at the control speed based on the target speed that is set for each of the reference points 52. Thus, for example, even when the generated control trajectory 76 goes straight ahead, the vehicle slows down to some extent when traveling in a section (e.g., in an area surrounding an obstacle) that may necessitate a lane change. This prevents the occurrence of sudden braking, sudden turning, etc. in case of an unexpected lane change.

As described in detail above, the autonomous driving assistance system 1 according to the embodiment, the autonomous driving assistance method by the autonomous driving assistance system 1, and the computer program executed by the navigation device 2 acquire (S11), from outside a host vehicle, obstacle information that includes the location of an obstacle on a road that has been acquired by another vehicle that travels, ahead of the host vehicle, along a planned travel route along which the host vehicle plans to travel; and generate (S14 to S22), as assistance information used for autonomous driving assistance performed in the host vehicle, a target speed and a travel trajectory candidate for the host vehicle on the basis of the obstacle information and lane information about the planned travel route. This makes it possible, even when the host vehicle travels through a section that has the obstacle, to continue the autonomous driving assistance that takes into account the obstacle so as to cause the host vehicle to travel along an appropriate travel trajectory at an appropriate speed. Thus, it is possible to prevent the occurrence of situations such as where sudden braking or unnecessary acceleration and deceleration are done, where the travel route is changed to a detour route, or where a driver is forced to drive manually regardless of the intention of the driver.

Figure 23:
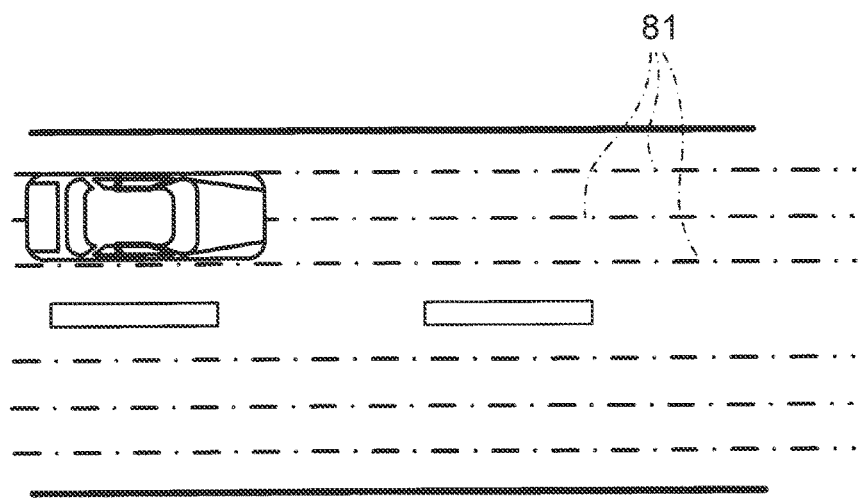
FIG. 23 is a diagram illustrating a modification of the embodiment.

Various improvements and modifications are possible without departing from the spirit of the inventive principles described herein. For example, although according to the embodiment, the travel trajectory candidates are set for the planned travel route such that one travel trajectory candidate is set for each lane, multiple travel trajectory candidates may be set for each lane. For example, as illustrated in FIG. 23, three travel trajectory candidates 81 may be set such that one is set closer to the center, another is set closer to the right, and the other is set closer to the left. This structure makes it possible to control where (closer to the right, closer to the center, or closer to the left) the vehicle travels in the lane, thus allowing performance of more detailed autonomous driving assistance. For example, when there is an obstacle that occupies a part, not the whole, of the lane, the control trajectory may be set such that the position of travel of the vehicle moves to the right or left within the same lane. This allows such control that causes the vehicle to avoid the obstacle without making a lane change.

Although according to the embodiment, a roadwork section, a vehicle stuck in congestion, and a parked vehicle are described as examples of the obstacle included in the obstacle information, other types of obstacles may be included. For example, the obstacle may be a bad road section, an icy road section, etc.

According to the embodiment, the autonomous driving assistance for causing the vehicle to travel autonomously without driving operations by a user denotes that the vehicle control ECU 20 controls, out of vehicle operations, all of an accelerator operation, a brake operation, and a steering operation that are operations associated with the behavior of the vehicle. Alternatively, in the autonomous driving assistance, the vehicle control ECU 20 may control, out of vehicle operations, at least one of an accelerator operation, a brake operation, and a steering operation that are operations associated with the behavior of the vehicle. On the other hand, the manual driving by driving operations by a user denotes that a user performs, out of vehicle operations, all of an accelerator operation, a brake operation, and a steering operation that are operations associated with the behavior of the vehicle.

Although, according to embodiment, the navigation device 2 executes the assistance information generation processing program (FIG. 4) and the autonomous driving assistance program (FIG. 15), the vehicle control ECU 20 may execute these programs instead. In this case, the vehicle control ECU 20 is structured to acquire, from the navigation device 2, the current location of the vehicle, the map information, the obstacle information, etc.

Further, not only to navigation devices but also other devices can have a route search function. For example, the a mobile phone, a smartphone, a tablet terminal, a personal computer, etc. (hereinafter referred to as a mobile terminal or the like) can be used instead of a navigation device. Further, a system including a server and the mobile terminal or the like can be used. In this case, either the server or the mobile terminal or the like may execute any step in the assistance information generation processing program (FIG. 4) and the autonomous driving assistance program (FIG. 15). However, when the mobile terminal or the like is used, a vehicle that is allowed to perform the autonomous driving assistance and the mobile terminal or the like need to be communicatively connected to each other (wired or wirelessly).

The autonomous driving assistance system may have structures and effects described below.

For example, a first structure includes the following: planned travel route acquiring means (41) for acquiring a planned travel route along which a host vehicle (3) plans to travel; map information acquiring means (41) for acquiring map information including lane information about a road that is included in the planned travel route; obstacle information acquiring means (41) for acquiring, from outside the host vehicle, obstacle information that includes the location of an obstacle on the road and that has been acquired by another vehicle that travels along the planned travel route ahead of the host vehicle; and assistance information generating means for generating, as assistance information that is used to perform autonomous driving assistance in the host vehicle that travels along the planned travel route, a travel trajectory candidate (50, 62, 64) for the host vehicle on the basis of the obstacle information and the lane information about the planned travel route. The autonomous driving assistance system having the above structure acquires, from an outside source, the obstacle information that relates to the obstacle and that has been acquired by the other vehicle that travels ahead, and generates the travel trajectory candidate on the basis of the acquired obstacle information. Thus, it is possible, even when the host vehicle travels through a section that has the obstacle, to continue the autonomous driving assistance that causes the host vehicle to travel along a travel trajectory that takes into account the obstacle. Thus, it is possible to prevent the occurrence of situations such as where a travel route is changed to a detour route, or where a driver is forced to drive manually regardless of the intention of the driver.

A second structure is as follows: the travel trajectory candidate (50, 62, 64) is set for each lane of the road that forms the planned travel route, and one or multiple travel trajectory candidates are set for the lane in the direction of travel of the host vehicle (3). According to the autonomous driving assistance system having the above structure, it is possible to appropriately set a candidate for a trajectory along which the vehicle travels, so as to accommodate a lane structure of the road that is included in the planned travel route.

A third structure is as follows: there are a plurality of the travel trajectory candidates (50, 62, 64); the assistance information includes information about a target speed for the host vehicle that is set for each of the travel trajectory candidates; and the assistance information generating means (41) sets the target speed for each of the travel trajectory candidates, on the basis of the obstacle information and an upper limit speed of the host vehicle when the host vehicle travels along the corresponding travel trajectory candidate. The autonomous driving assistance system having the above structure sets multiple travel trajectory candidates that are candidates for a trajectory along which the vehicle travel, and sets the target speed for each of the travel trajectory candidates by taking into account the obstacle information. Thus, it is possible to continue the autonomous driving assistance that takes into account the obstacle so as to cause the vehicle to travel along an appropriate travel trajectory at an appropriate speed. Further, in cases where there are multiple travel trajectory candidates that are candidates for a trajectory along which the vehicle travels, it is possible to make a more detailed comparison including how the vehicle travel along the travel trajectory candidates. In addition, the upper limit speed and the target speed that takes into account the obstacle can be set beforehand for the travel trajectory candidates. This makes it possible to prevent sudden braking and unnecessary acceleration and deceleration, regardless of which travel trajectory candidate is selected as a control trajectory along which the vehicle actually travels.

A fourth structure is as follow: the assistance information generating means (41) sets, to the upper limit speed, a lower one of a speed limit set for the road that forms the planned travel route, and a traveling speed that causes the host vehicle (3) to have a maximum lateral acceleration equal to a predetermined upper limit when the host vehicle travels along the travel trajectory candidate (50, 62, 64). According to the autonomous driving assistance system having the above structure, it is possible to set the target speed for the vehicle when the vehicle travels along the travel trajectory candidate, on the basis of the shape of the travel trajectory candidate that is a candidate for a trajectory along which the vehicle travels.

A fifth structure is as follows: the assistance information generating means (41) sets, to the target speed, a lower one of the upper limit speed and a recommended speed that is determined on the basis of the type of the obstacle, and corrects the target speed to satisfy a condition that acceleration and deceleration of the host vehicle (3) that travels along the travel trajectory candidate (50, 62, 64) are less than or equal to thresholds. According to the autonomous driving assistance system having the above structure, it is possible to appropriately set the target speed for each of the travel trajectory candidates that are candidates for trajectories along which the vehicle travels, in such a manner that acceleration and deceleration burdening a user and vehicle control are not caused.

A sixth structure is as follows: when the obstacle narrows the lane, the assistance information generating means (41) sets, to the recommended speed, a speed of another vehicle that travels in an area affected by the obstacle within a lane as a destination from the narrowed lane. The autonomous driving assistance system having the above structure sets the target speed for the travel trajectory candidate that necessitates a lane change, in such a manner that the vehicle travels in advance at a traffic flow speed in a destination lane. This allows the vehicle to make a lane change smoothly. Further, this completes speed control before the vehicle reaches a section where the vehicle makes a lane change, thus giving more opportunities for the vehicle to make a lane change.

A seventh structure is as follows: when the obstacle is roadwork, the assistance information generating means (41) sets, to the recommended speed, a slow speed or a speed of another vehicle that travels in an area affected by the obstacle. The autonomous driving assistance system having the above structure sets the target speed for the travel trajectory candidate that is used when the vehicle travels through a roadwork section, in such a manner that the vehicle travels in advance at a traffic flow speed in the roadwork section or at a slow speed. This makes it possible to prevent sudden deceleration control from being performed.

An eighth structure is as follows: when the obstacle is a vehicle stuck in congestion, the assistance information generating means (41) sets, to the recommended speed, a speed of the vehicle stuck in congestion. The autonomous driving assistance system having the above structure sets the target speed for a travel trajectory candidate that is used when the vehicle travels through a congested section, in such a manner that the vehicle travels in advance at a traffic flow speed in the congested section. This makes it possible to prevent sudden deceleration control from being performed.

A ninth structure is as follows: the assistance information generating means (41) corrects the target speed to satisfy a condition that an acceleration section and a deceleration section do not follow each other within a predetermined distance. According to the above structure, the autonomous driving assistance system minimizes unnecessary acceleration control and deceleration control, thus allowing the vehicle to travel in such a manner that fuel efficiency is increased and that an occupant of the vehicle feel comfortable.

A tenth structure is as follow: there are a plurality of the travel trajectory candidates (50, 62, 64); the assistance information includes information about a priority that is set for each of the travel trajectory candidates and that indicates how much the host vehicle (3) preferentially travels along the travel trajectory candidate over any other travel trajectory candidates; and the assistance information generating means sets the priority for each of the travel trajectory candidates on the basis of the location of the obstacle and a type of the obstacle. The autonomous driving assistance system having the above structure sets multiple travel trajectory candidates that are candidates for a trajectory along which the vehicle travel, and sets the priority indicating how much the vehicle preferentially travels along the travel trajectory candidate. Thus, when there are multiple travel trajectory candidates that are candidates for a trajectory along which the vehicle travel, it is possible to make a specific comparison that takes into account the relationship between the obstacle and each of the travel trajectory candidates. This makes it possible to more appropriately select, among the travel trajectory candidates, a control trajectory along which the vehicle travels.

An eleventh structure is as follow: the assistance information generating means (41) sets the priority by taking into account which lane the host vehicle (3) should preferentially travel in so that the host vehicle travels along the planned travel route. The autonomous driving assistance system having the above structure takes into account the planned travel route in addition to the obstacle information when setting the priority indicating how much the vehicle preferentially travels along the travel trajectory candidate. Thus, when there are multiple travel trajectory candidates that are candidates for a trajectory along which the vehicle travel, it is possible to make a specific comparison that takes into account the relationship between the planned travel route and each of the travel trajectory candidates. This makes it possible to more appropriately select, among the travel trajectory candidates, a control trajectory along which the vehicle travels.

A twelfth structure further includes the following: autonomous driving assistance means for setting a control trajectory (76) on the road where the host vehicle (3) travels, on the basis of the assistance information generated by the assistance information generating means (41), and for controlling the host vehicle such that the host vehicle travels along the set control trajectory. According to the autonomous driving assistance system having the above structure, it is possible to set an appropriate control trajectory on the basis of the generated assistance information, and to cause the host vehicle to travel along the control trajectory. Specifically, referring to the target speed and the travel trajectory candidate that are included in the greatened information makes it possible to comprehensively determine which travel trajectory the vehicle should travel along (which timing the vehicle should make a lane change at, etc.). Further, in cases where there is such an obstacle that narrows the lane ahead in the direction of travel of the vehicle, even when the vehicle fails, for some reasons, to make a lane change at ideal timing for the lane change, a new control trajectory that moves to an adjacent lane is provided thereafter. This makes it possible to perform appropriate autonomous driving assistance without interrupting the autonomous driving assistance.

A thirteenth structure further includes the following: obstacle identifying means (41) for identifying the obstacle for which the assistance information is generated, on the basis of valid period information that is included in the obstacle information and that indicates a valid period of information. The autonomous driving assistance system having the above structure identifies in advance an obstacle whose location is unidentifiable from the current location of the host vehicle. Thus, it is possible to perform the autonomous driving assistance by taking into account the obstacle. Further, setting the valid period improves the reliability of the obstacle information, thus preventing the autonomous driving assistance from being performed by taking into account an obstacle that no longer exists.

A fourteenth structure is as follows: the valid period information is information set valid from a first time indicating a start of the valid period to a second time indicating an end of the valid period. The autonomous driving assistance system according to the above structure defines the start and end of the period during which the obstacle information is valid. Thus, it is possible to clearly define the period during which the obstacle information is valid.

The invention claimed is:

1. An autonomous driving assistance system comprising:
a processor programmed to:
acquire a planned travel route along which a host vehicle plans to travel;
acquire map information including lane information about a road that is included in the planned travel route;
acquire, from outside the host vehicle, obstacle information that includes a location of an obstacle on the road and that has been acquired by another vehicle that travels along the planned travel route ahead of the host vehicle;

generate, as assistance information that is used to perform autonomous driving assistance in the host vehicle that travels along the planned travel route, a plurality of travel trajectory candidates for the host vehicle based on the obstacle information and the lane information about the planned travel route, the assistance information including information about a target speed for the host vehicle, the target speed being set for each of the travel trajectory candidates; and set the target speed for each of the travel trajectory candidates, based on the obstacle information and an upper limit speed of the host vehicle when the host vehicle travels along the travel trajectory candidate.

2. The autonomous driving assistance system according to claim 1, wherein:

one or a plurality of the travel trajectory candidates is set for each lane of the road that forms the planned travel route; and one or a plurality of the travel trajectory candidates are set for each lane in a direction of travel of the host vehicle.

3. The autonomous driving assistance system according to claim 1, wherein the processor is programmed to:

set, to the upper limit speed, a lower one of a speed limit set for the road that forms the planned travel route, and a traveling speed that causes the host vehicle to have a maximum lateral acceleration equal to a predetermined upper limit when the host vehicle travels along the travel trajectory candidate.

4. The autonomous driving assistance system according to claim 1, wherein the processor is programmed to:

set, to the target speed, a lower one of the upper limit speed and a recommended speed that is determined based on a type of the obstacle; and correct the target speed to satisfy a condition that acceleration and deceleration of the host vehicle that travels along the travel trajectory candidate are less than or equal to thresholds.

5. The autonomous driving assistance system according to claim 4, wherein the processor is programmed to:

when the obstacle narrows a lane, set, to the recommended speed, a speed of another vehicle that travels in an area affected by the obstacle within the lane as a destination from the narrowed lane.

6. The autonomous driving assistance system according to claim 4, wherein the processor is programmed to:

when the obstacle is roadwork, set, to the recommended speed, a slow speed or a speed of another vehicle that travels in an area affected by the obstacle.

7. The autonomous driving assistance system according to claim 4, wherein the processor is programmed to:

when the obstacle is a vehicle stuck in congestion, set, to the recommended speed, a speed of the vehicle stuck in congestion.

8. The autonomous driving assistance system according to claim 4, wherein the processor is programmed to:

correct the target speed to satisfy a condition that an acceleration section and a deceleration section do not follow each other within a predetermined distance.

9. The autonomous driving assistance system according to claim 1, wherein the assistance information includes information about a priority that is set for each of the travel trajectory candidates, the priority indicating how much the host vehicle preferentially travels along the travel trajectory candidate over any other travel trajectory candidates; and the processor is programmed to set the priority for each of the travel trajectory candidates based on the location of the obstacle and a type of the obstacle.

10. The autonomous driving assistance system according to claim 9, wherein the processor is programmed to:

set the priority by taking into account which lane the host vehicle should preferentially travel in so that the host vehicle travels along the planned travel route.

11. The autonomous driving assistance system according to claim 1, wherein the processor is programmed to:

set a control trajectory on the road where the host vehicle travels, based on the generated assistance information; and control the host vehicle such that the host vehicle travels along the set control trajectory.

12. The autonomous driving assistance system according to claim 1, wherein the processor is programmed to:

identify the obstacle for which the assistance information is generated, based on valid period information that is included in the obstacle information and that indicates a valid period of information.

13. The autonomous driving assistance system according to claim 12, wherein:

the valid period information is information set valid from a first time indicating a start of the valid period to a second time indicating an end of the valid period.

14. An autonomous driving assistance method, comprising:

acquiring a planned travel route along which a host vehicle plans to travel;

acquiring map information including lane information about a road that is included in the planned travel route;

acquiring, from outside the host vehicle, obstacle information that includes a location of an obstacle on the road and that has been acquired by another vehicle that travels along the planned travel route ahead of the host vehicle; and generating, as assistance information that is used to perform autonomous driving assistance in the host vehicle that travels along the planned travel route, a plurality of travel trajectory candidates for the host vehicle based on the obstacle information and the lane information about the planned travel route, the assistance information including information about a target speed for the host vehicle, the target speed being set for each of the travel trajectory candidates; and setting the target speed for each of the travel trajectory candidates, based on the obstacle information and an upper limit speed of the host vehicle when the host vehicle travels along the travel trajectory candidate.

15. A computer-readable storage medium storing an autonomous driving assistance program that causes a computer to perform function comprising:

acquiring a planned travel route along which a host vehicle plans to travel;

acquiring map information including lane information about a road that is included in the planned travel route;

acquiring, from outside the host vehicle, obstacle information that includes a location of an obstacle on the road and that has been acquired by another vehicle that travels along the planned travel route ahead of the host vehicle;

generating, as assistance information that is used to perform autonomous driving assistance in the host vehicle that travels along the planned travel route, a plurality of travel trajectory candidates for the host vehicle based on the obstacle information and the lane information about the planned travel route, the assistance information including information about a target speed for the host vehicle, the target speed being set for each of the travel trajectory candidates; and setting the target speed for each of the travel trajectory candidates, based on the obstacle information and an upper limit speed of the host vehicle when the host vehicle travels along the travel trajectory candidate.

\* \* \* \* \*